United States Patent
Ishida et al.

(10) Patent No.: US 7,819,232 B2
(45) Date of Patent: Oct. 26, 2010

(54) CLUTCH AND VEHICLE HAVING THE SAME

(75) Inventors: Yousuke Ishida, Iwata (JP); Akifumi Oishi, Iwata (JP); Takuji Murayama, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 763 days.

(21) Appl. No.: 11/554,486

(22) Filed: Oct. 30, 2006

(65) Prior Publication Data

US 2007/0137967 A1    Jun. 21, 2007

(30) Foreign Application Priority Data

Oct. 31, 2005  (JP) .............................. 2005-315541

(51) Int. Cl.
*F16H 19/00* (2006.01)
(52) U.S. Cl. ................... 192/96; 192/70.23; 192/89.21; 192/99 S
(58) Field of Classification Search .............. 192/89.21, 192/70.23, 96, 99 S
See application file for complete search history.

(56) References Cited

U.S. PATENT DOCUMENTS

| 4,497,222 A | | 2/1985 | Nagaoka et al. | |
| 4,592,458 A | * | 6/1986 | Matsuki et al. | ............... 192/83 |
| 6,257,081 B1 | | 7/2001 | Gagnon et al. | |
| 6,524,224 B2 | | 2/2003 | Gagnon et al. | |
| 6,564,663 B2 | | 5/2003 | Rioux et al. | |
| 6,931,839 B2 | | 8/2005 | Foster | |
| 2005/0000775 A1 | * | 1/2005 | Drussel et al. | .......... 192/105 B |

FOREIGN PATENT DOCUMENTS

JP          58-12718          1/1983

* cited by examiner

*Primary Examiner*—David D Le
*Assistant Examiner*—Derek D Knight
(74) *Attorney, Agent, or Firm*—Keating & Bennett, LLP

(57) ABSTRACT

A clutching system comprises a lever mechanism portion and a clutch mechanism portion. The lever mechanism portion comprises a push lever. The push lever comprises a cam surface. The clutch mechanism portion comprises a push rod. The push rod comprises a cam follower. A Belleville spring functions as a clutch spring. The cam surface and the cam follower are formed such that a lever ratio of the push lever at a pivot start position is larger than a lever ratio of the push lever at a pivot finish position. The Belleville spring is formed such that a force required to move the push lever at the pivot finish position is smaller than a force required to move to the push lever at the pivot start position.

10 Claims, 32 Drawing Sheets

CLUTCH AND VEHICLE HAVING THE SAME

CROSS-REFERENCE TO RELATED APPLICATIONS

This application claims the priority benefit of Japanese Patent Application No. 2005-315541, filed Oct. 31, 2005, which is hereby incorporated by reference in its entirety.

BACKGROUND OF THE INVENTION

1. Field of the Invention

The present invention generally relates to a clutch system and a vehicle having the same. In particular, the present invention relates to a clutch comprising a lever mechanism portion and a clutch mechanism portion that is operated by movement of the lever mechanism portion and a vehicle having the same.

2. Description of the Related Art

It is known to disengage a clutch brought by operation of a lever mechanism portion. Operation of the lever mechanism portion is transmitted to a clutch mechanism portion.

A clutch mechanism portion of a clutch includes a plurality of clutch plates (friction plates), an operating plate that presses against the clutch plates, a compression coil spring that urges the operating plate toward the clutch plate, and a push pin connected to the operating plate. Further, a lever mechanism portion of the clutch includes a clutch lever that is pivotally mounted, and a cam that is pivoted by operating the clutch lever. The cam is brought into contact with the push pin of the clutch mechanism portion. When the clutch is engaged, adjoining clutch plates are brought into contact with each other due to pressure applied by the operating plate. To disengage the clutch, one grabs the clutch lever and pivots the clutch lever. Movement of the clutch lever is transferred to the push pin. The push pin moves against the biasing force of the spring and the force of the push pin overcomes the pressure applied by the operating plate. With the operating plate not supplying pressure to the plates, the plates are able to rotate relative to each other and the clutch is disengaged.

A distance in a pivot radius direction from a pivot center to a position of bringing the cam and the push pin into contact with each other (hereinafter, referred to as a pivot radius of the cam) at a position of starting to pivot the cam (i.e., the position of starting a clutch disengagement operation) is set to be smaller than the pivot radius of the cam at a position of finishing to pivot the cam (i.e., the position of finishing the clutch disengagement operation). Therefore, according to the prior clutch, torque generated at the cam in the connected state of the clutch is small and therefore, the clutch lever (cam) can be pivoted by a small force from the pivot start position.

SUMMARY OF THE INVENTION

However, the pivot radius of the cam at the position of finishing to pivot the cam (i.e., the position of finishing clutch disengagement operation) is large and therefore, there is a drawback that the torque generated at the cam becomes large at the pivot finish position. Further, the compression coil spring is used as the clutch spring and, therefore, when the cam is pivoted to reach the pivot finish position, there is a drawback that the biasing force of the clutch spring becomes large by enlarging an amount of flexing (i.e., the amount of compressing) of the clutch spring. Therefore, the bias force of the clutch spring applied to the cam at the pivot finish position is large and, therefore, there is a drawback that the torque generated at the cam at the pivot finish position increases. As a result, when the disengaged state of the clutch is maintained, it is necessary to hold the clutch lever (cam) by a large force at the pivot finish position and therefore, there poses a problem that an operability of the clutch lever is deteriorated. In other words, it takes more effort to keep the clutch disengaged.

Whereas a load of operating the clutch lever at the pivot start position (i.e., the position of starting the clutch disengagement operation) is reduced by operation of the cam, the load of operating the clutch lever at the clutch finish position of the cam (i.e., the position of finishing the clutch disengagement operation) remains large and, therefore, there is a drawback that a difference between the load of operating the clutch lever at the pivot start position of the cam (i.e., the position of starting the clutch disengagement operation) and the load of operating the clutch lever at the pivot finish position of the cam (i.e., the position of finishing the clutch disengagement operation) becomes large. Therefore, an amount of a change in the load of the clutch in the clutch disengagement operation is increased and it is difficult to operate the clutch smoothly. This deteriorates the feel and smoothness of clutch lever operation.

Thus, one aspect of the present invention seeks to resolve the above-described problem and it is an object of the invention to provide a clutch capable of improving the performance of a clutch lever.

Another aspect of the present invention involves providing a vehicle having a clutch capable of improving the performance of a clutch lever.

Thus, one embodiment of a clutch system that is arranged and configured in accordance with certain features, aspects and advantages of the present invention comprises a lever mechanism portion and a clutch mechanism portion. The lever mechanism portion comprises a lever having a first contact portion. The clutch mechanism portion comprises a pressing member that generates a friction force between adjacent rotating plates by bringing the rotating plates into contact with each other through movement in a first direction. A biasing member is provided to bias the pressing member in the first direction. A relay member contacts the first contact portion of the lever. The relay member includes a second contact portion that contacts the first contact portion of the lever when the lever is pivoted. The relay member transmits movement of the lever mechanism portion to the pressing member. The clutch preferably is formed such that the pressing member is moved in a second direction reverse to the first direction against a biasing force of the biasing member and the adjacent rotating plates can separate from each other when the second contact portion of the relay member is contacted by the first contact portion of the lever by pivoting the lever of the lever mechanism portion in the predetermined direction from a pivot start position to a pivot finish position. The first contact portion of the lever and the second contact portion of the relay member preferably are constructed such that a lever ratio of the lever at the pivot start position of the lever is larger than a lever ratio of the lever at the pivot finish position of the lever. The biasing member preferably is constructed such that a force applied to the lever at the pivot finish position of the lever is smaller than a force applied to the lever at the pivot start position of the lever.

Such a construction allows a torque associated with beginning to move the lever to be decreased. In other words, when the rotating plates that are adjacent to each other are separated from each other in starting to disengage the clutch, the lever can be pivoted in the predetermined direction from the pivot start position by a small force. Further, with the preferred biasing member, the force applied to the lever at the pivot finish position of the lever becomes smaller than the force applied to the lever at the pivot start position of the lever. Even when the lever ratio at the pivot finish position of the lever is small, the torque input into the lever at the pivot finish position can be maintained at a lower value. Thereby, when the disengagement of the clutch is maintained, the lever can be maintained at the pivot finish position with a relatively small force. In this way, not only in starting to disengage the clutch, but also in maintaining the disengagement of the clutch, the lever can be operated by a relatively small force and, therefore, an operability of the lever for disengaging the clutch can be improved. Further, by making the lever ratio at the pivot start position of the lever (i.e., the clutch disengagement operation start position) large and providing the biasing member such that the force applied to the lever at the pivot finish position of the lever (i.e., the clutch disengagement operation finish position) is small, the force required to operate the lever at both of the pivot start position of the lever and the pivot finish position of the lever can be reduced and therefore, in comparison with the case of enlarging only the lever ratio by the cam, an amount of a change in the loads applied to the lever at the pivot start position of the lever and the pivot finish position of the lever can be reduced. Thus, the clutch can be operated smoothly and the operability of the clutch can be improved.

Preferably, the first contact portion of the lever and the second contact portion of the relay member respectively define a cam and a cam follower that, when brought into contact, result in the contact position that changes over the range of motion such that the lever ratio at the pivot start position is larger than the lever ratio at the pivot finish position. When constructed in this manner, the torque generated at the lever at the pivot start position (i.e., the clutch disengagement operation start position) can be reduced.

An extension can extend from the contact position between the cam and cam follower along an axis of the cam follower. When the lever reaches the pivot finish position by being pivoted in a predetermined direction, the extension can be moved from one side of a pivot axis of the lever to the other side. When constructed in such a manner, the position of the cam of the lever making contact with the cam follower of the relay member can be moved in the same direction as the extension while pressing the cam follower. Thus, in pressing, the forces extend in an axial direction. As a result, the relay member is less likely to be bent.

In one preferred configuration, the cam and the cam follower define the first contact portion of the lever and the second contact portion of the relay member, respectively. When constituted in this way, the cam follower can be readily pressed by the cam when the lever is pivoted.

In some configurations, the lever of the lever mechanism portion can include a pivoting lever having the cam connected to a clutch lever by way of a wire, and the relay member of the clutch mechanism portion can be formed in a rod-like shape with one end portion thereof defining the cam follower and the other end portion being connected to the pressing member. The pressing member, which is connected to the relay member, can be moved against the biasing force of the biasing member by movement of the relay member caused by the cam of the pivoting lever.

In some configurations, the lever of the lever mechanism portion can include a pivoting lever having the cam connected to a clutch lever by way of a wire, and the relay member of the clutch mechanism portion can include a hole portion that is connected to the pressing member and that is inserted with the cam of the pivoting lever. The cam follower can comprise an inner side face of the hole portion of the relay member. When so constructed, the pressing member connected to the relay member can be moved against the biasing force of the pressing member when the cam follower is moved through contact of the cam of the pivoting lever with the inner side of a face of the hole portion of the relay member.

In the constitution in which the first contact portion of the lever includes the cam and the second contact portion of the relay member includes the cam follower, preferably, the clutch mechanism portion further includes an hydraulic mechanism portion including a cylinder, a piston fitted to inside of the cylinder and moveable in a direction along a center axis of the cylinder by being pressed by the relay member and generating a hydraulic pressure at inside of the cylinder. An oil amount adjusting portion can be provided to adjust the amount of oil inside of the cylinder. The pressing member can be moved against the biasing force of the biasing member by the hydraulic pressure generated inside of the cylinder. When constructed in this manner, even when the rotating plates are expanded by heat, by adjusting the oil amount inside of the cylinder by the oil amount adjusting portion, the hydraulic pressure inside of the cylinder at the pivot start position of the lever is less likely to be changed. Thereby, an amount of pivoting the lever capable of disengaging the clutch is more likely to remain consistent over varied temperature conditions.

Where the clutch mechanism portion comprises the hydraulic mechanism portion, the lever of the lever mechanism portion can include a clutch lever having the first contact portion constituting the cam, and the relay member of the clutch mechanism portion can include the second contact portion constituting the cam follower. The cam follower contacts the cam of the clutch lever. The relay member can be positioned inside of a cylinder and can be axially moveable therein along the center axis of the cylinder. When so constructed, by pressing the second contact portion of the relay member with the first contact portion of the clutch lever to cause axial movement of the relay member, the piston can be axially moved as well.

Where the clutch mechanism portion comprises the hydraulic mechanism portion, a constitution can be used in which the lever of the lever mechanism portion includes a clutch lever having the first contact portion constituting the cam, and the relay member of the clutch mechanism portion includes the second contact portion constituting the cam follower pressed by the cam of the clutch lever. The relay member can be installed pivotably outside of the cylinder and the relay member can move the piston when the relay member is pivoted. When constituted in this manner, the piston can be axially moved by pressing to pivot the second contact portion of the relay member with the first contact portion of the clutch lever.

Preferably, the biasing member is formed such that the force applied to the lever is gradually reduced from the pivot start position to the pivot finish position of the lever. When constructed in this manner, in a case in which a cam ratio is reduced from the pivot start position of lever to the pivot finish position and the force applied to the lever is reduced by the biasing member, a change in the force applied to the lever can be made smooth by a synthesized force of the cam and the biasing member. Thus, such a clutch can be operated more smoothly.

Preferably, the biasing member includes a Belleville spring. The Belleville spring helps the force applied to the lever at the pivot finish position of the lever to be made smaller than the force applied to the lever at the pivot start position of the lever.

The clutch system can be used with a number of suitable vehicular applications. The vehicle would then feature an improved clutch system that has improved performance.

BRIEF DESCRIPTION OF THE DRAWINGS

These and other features, aspects and advantages of the present invention will now be described with reference to the drawings of several preferred embodiments, which embodiments are intended to illustrate and not to limit the invention.

Figure 2:
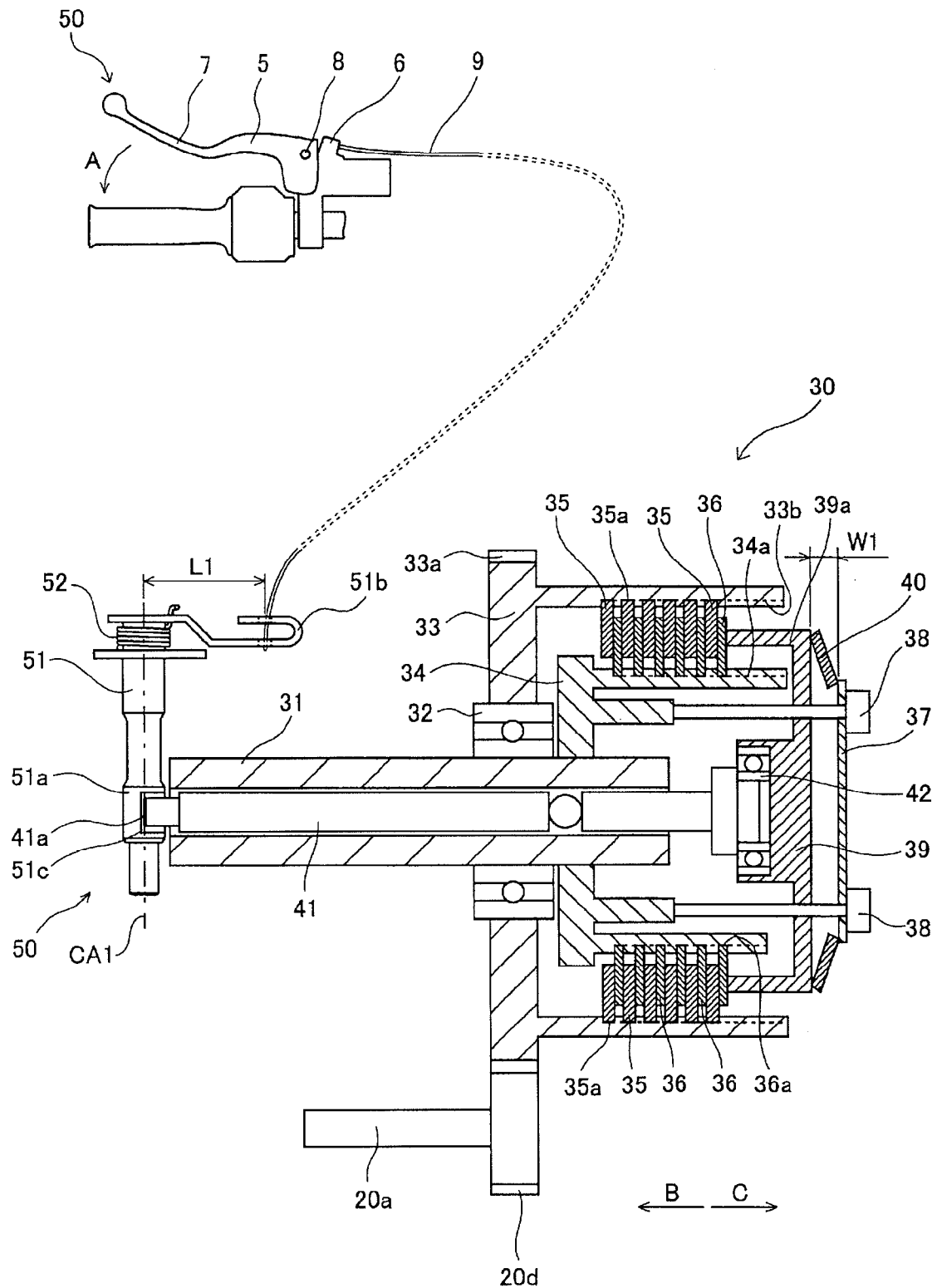
FIG. 2 is a view of the clutch system of FIG. 1, showing the clutch being engaged.

FIG. s7 is a detailed view of the state of disengaging the clutch system of FIG. 2.

Figure 7:
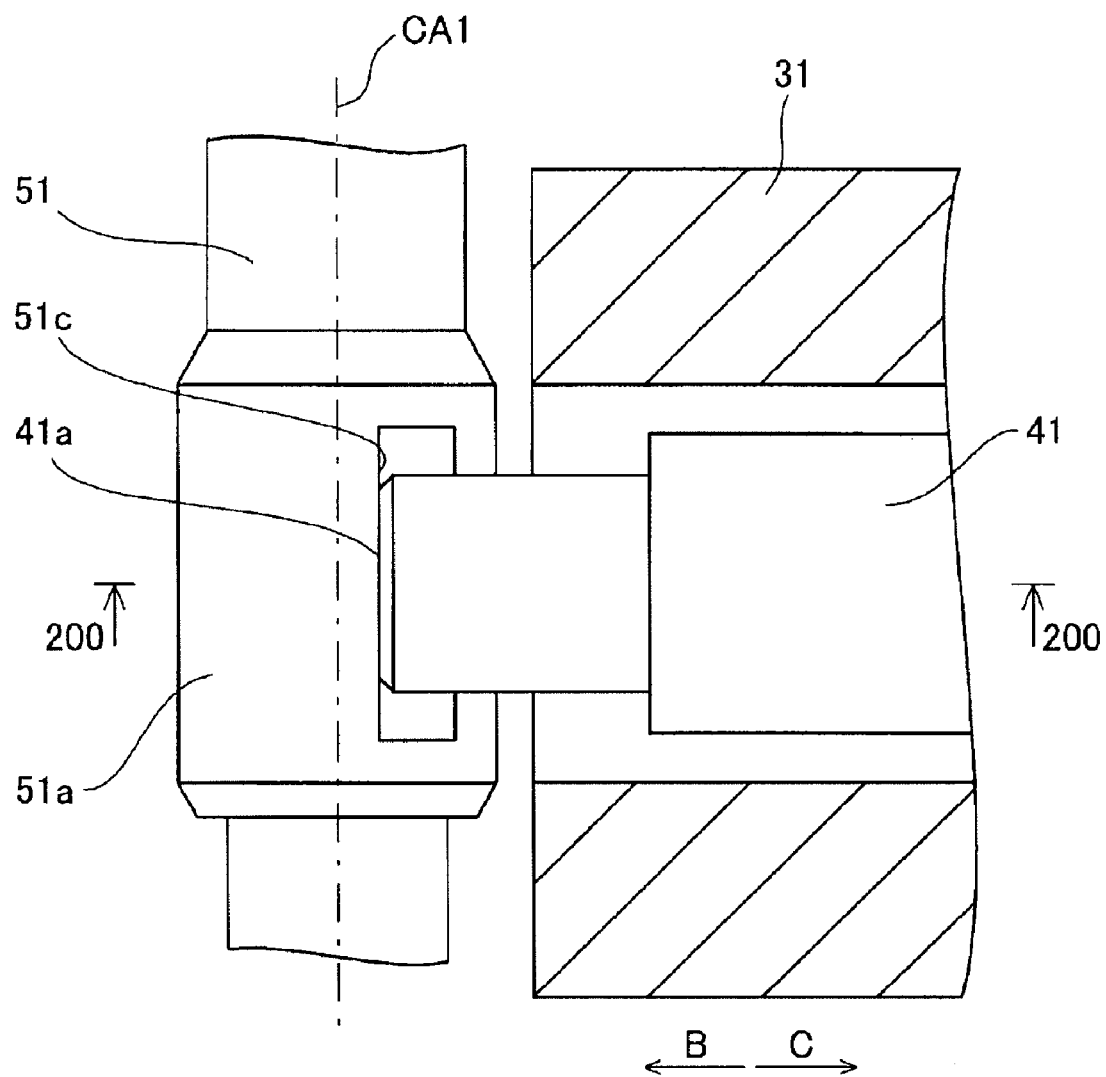
Figure 8:
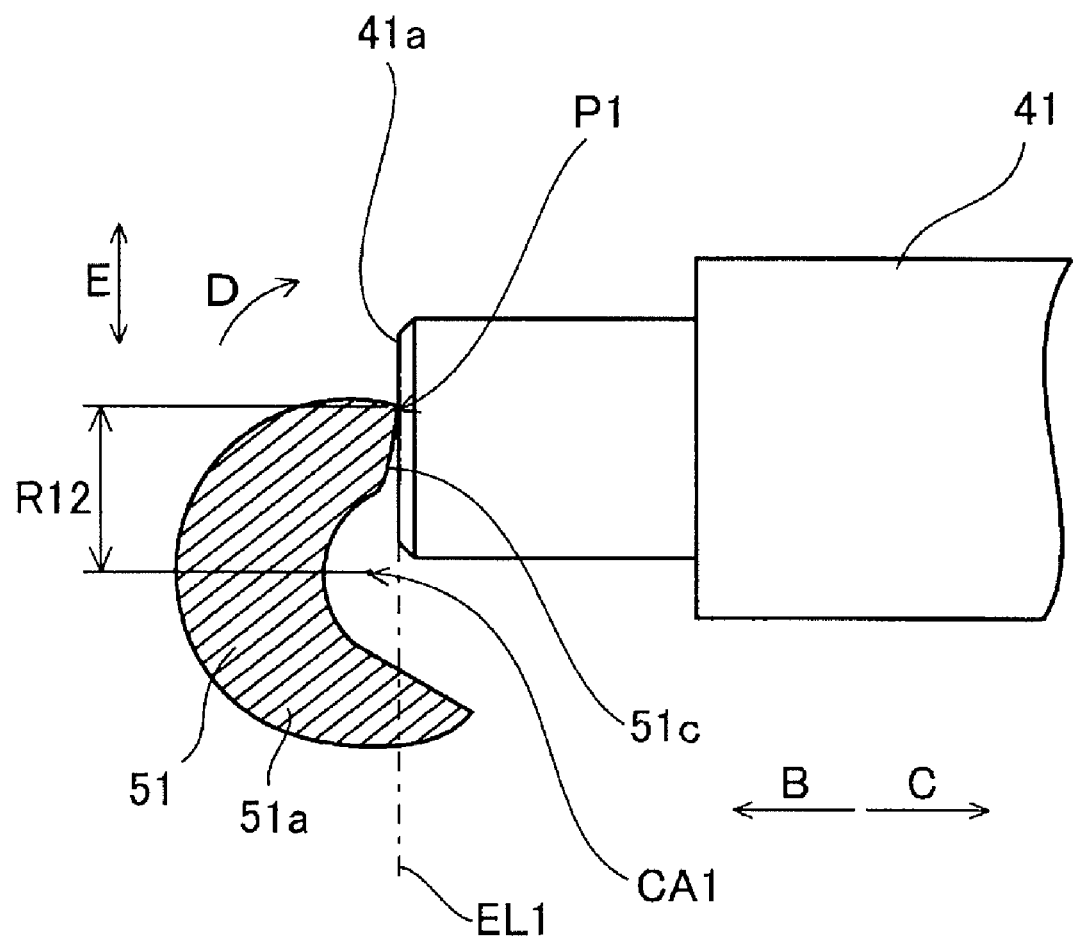

FIG. 8 is a sectional view taken along a line 200-200 of FIG. 7.

Figure 9:
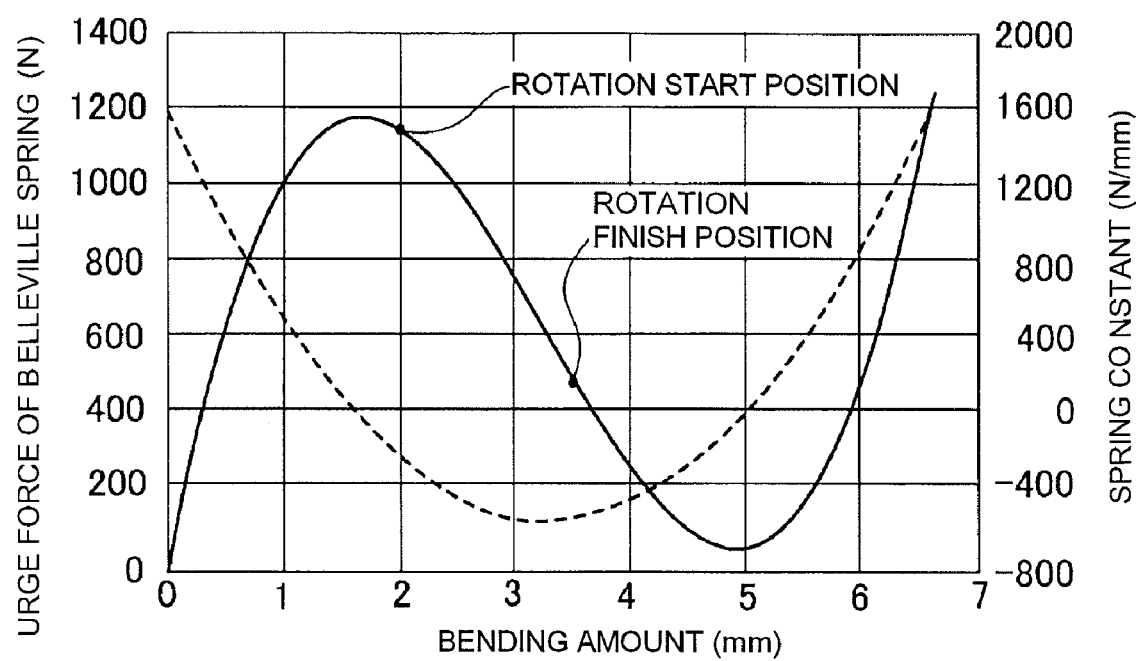

FIG. 9 is a graph showing a spring characteristic of a clutch spring (Belleville spring) used in the clutch system of FIG. 2.

Figure 10:
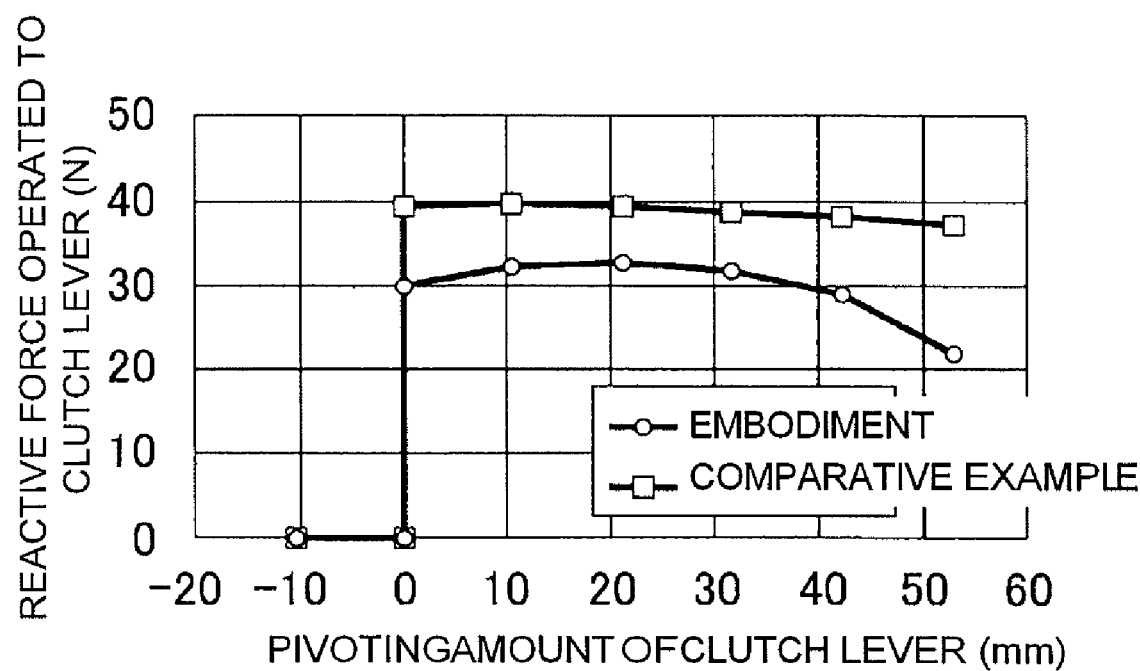

FIG. 10 is a graph showing a relationship between an amount of pivoting a clutch lever and a reactive force operated to the clutch lever.

Figure 11:
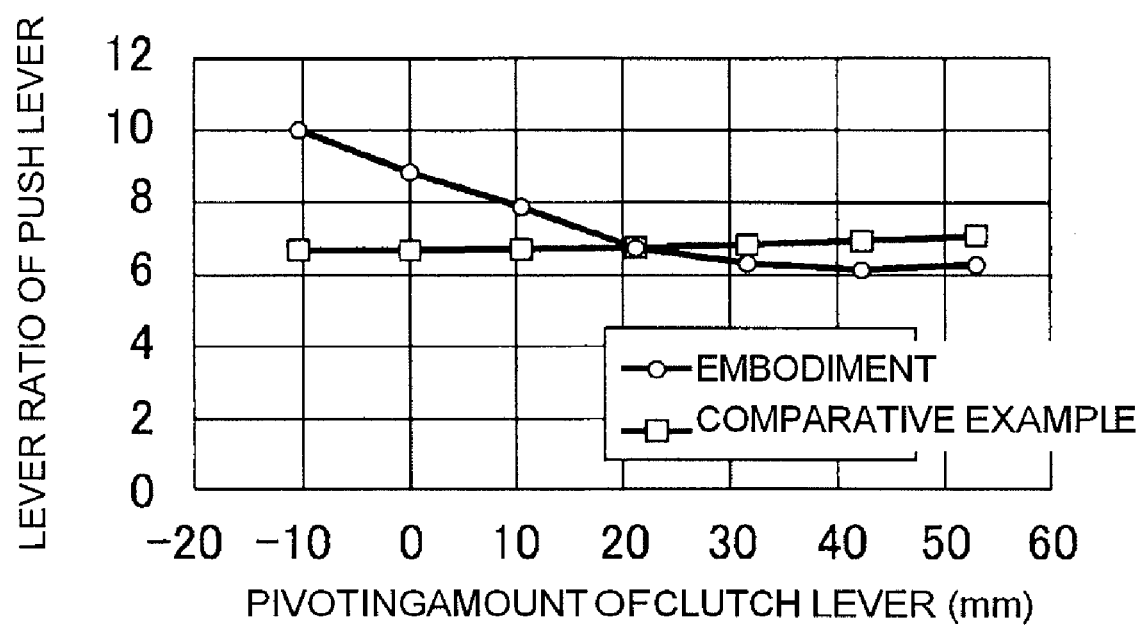

FIG. 11 is a graph showing a relationship between the amount of pivoting the clutch lever and a lever ratio of a push lever.

Figure 12:
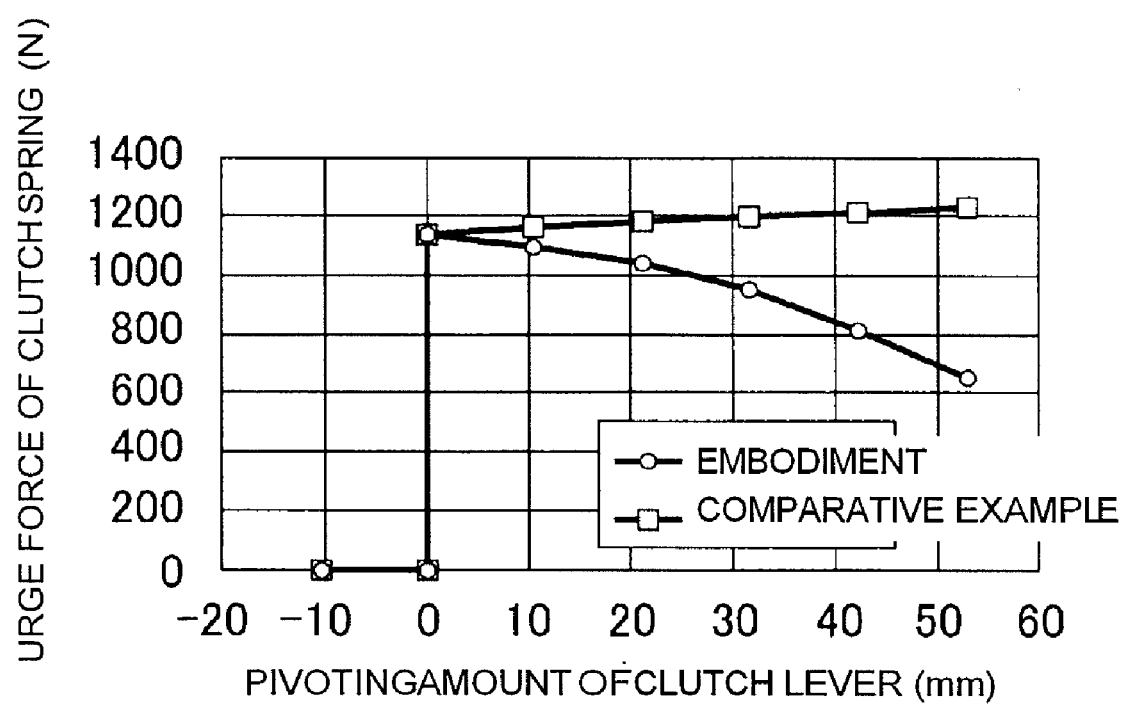

FIG. 12 is a graph showing a relationship between the amount of pivoting the clutch lever and an urge force of the clutch spring.

Figure 13:
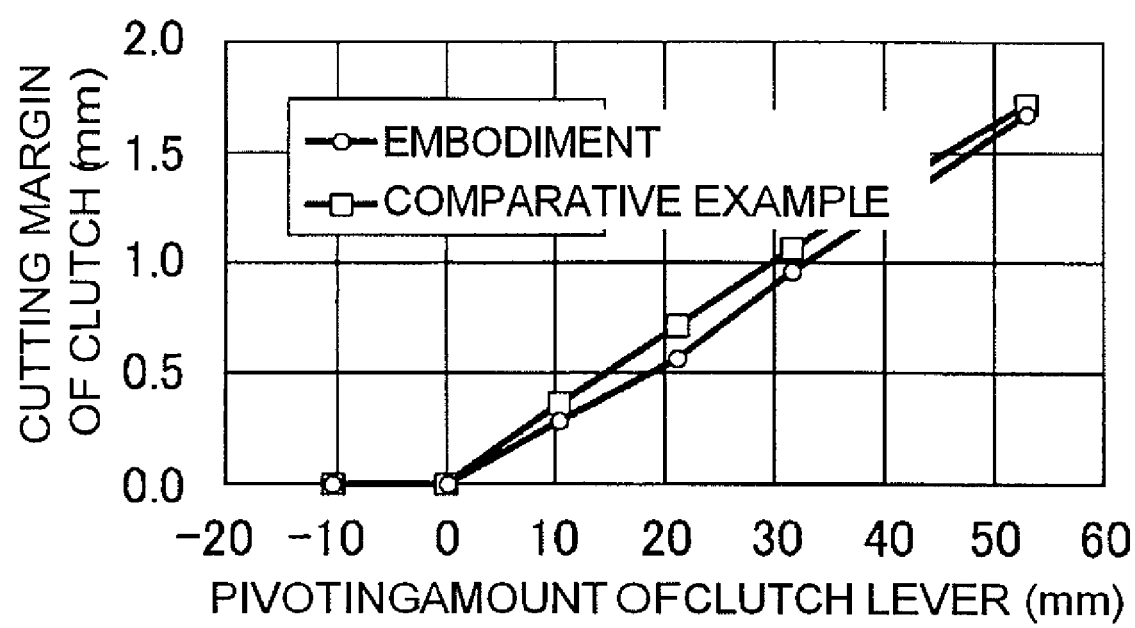

FIG. 13 is a graph showing a relationship between the amount of pivoting the clutch lever and a margin of disengaging the clutch.

Figure 14:
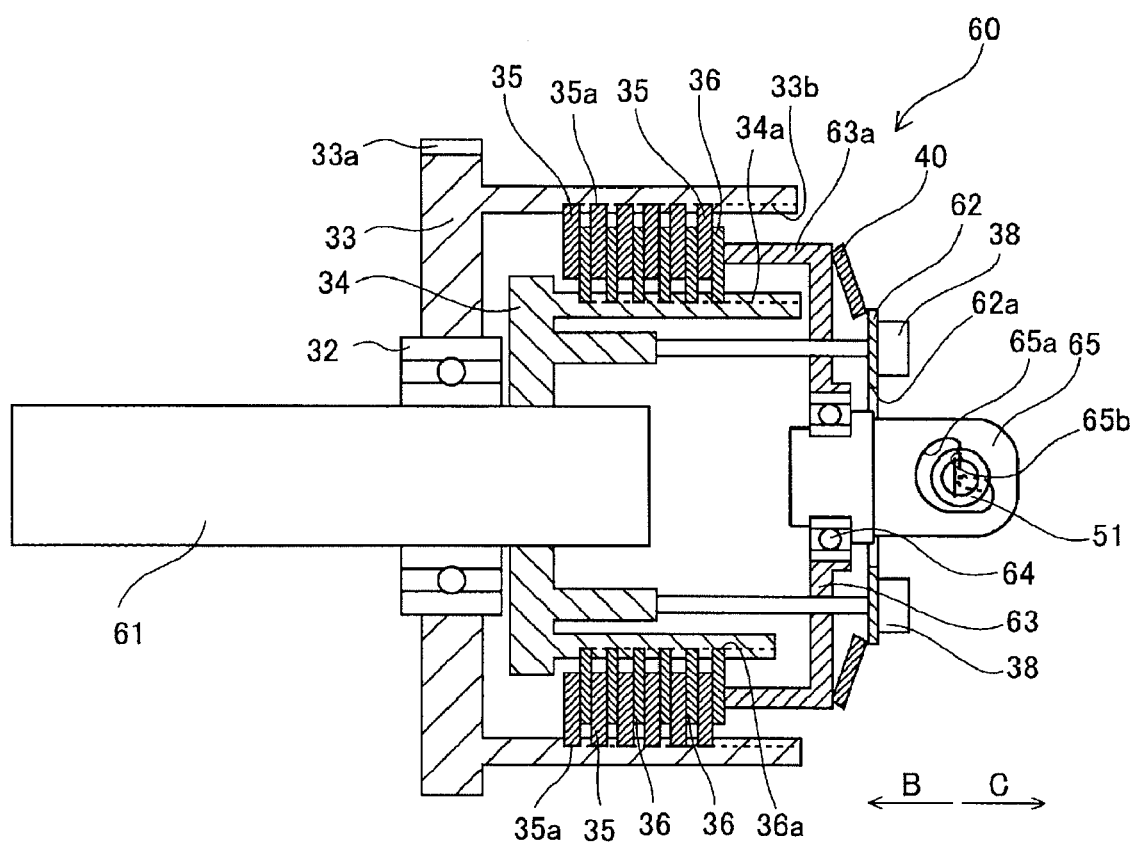

FIG. 14 is a sectional view showing a state of engaging a clutch according to a second embodiment that is arranged and configured in accordance with certain features, aspects and advantage of the present invention.

Figure 15:
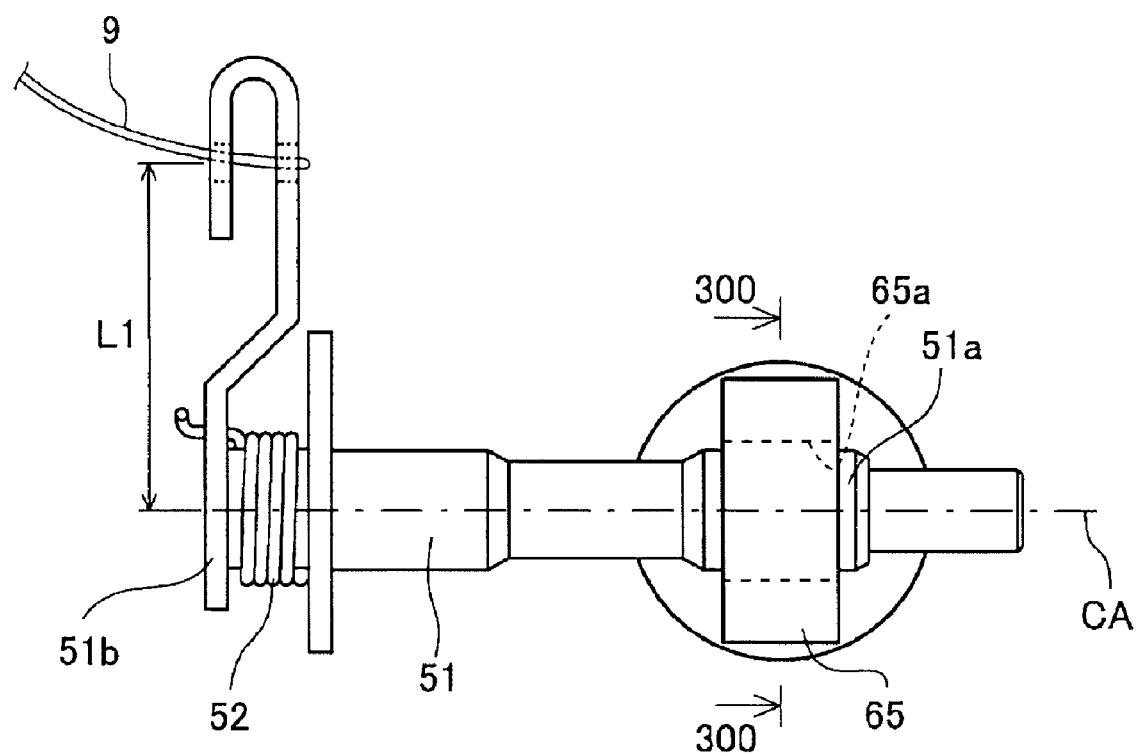

FIG. 15 is a detailed view of the state of engaging the clutch according to the embodiment shown in FIG. 14.

Figure 16:
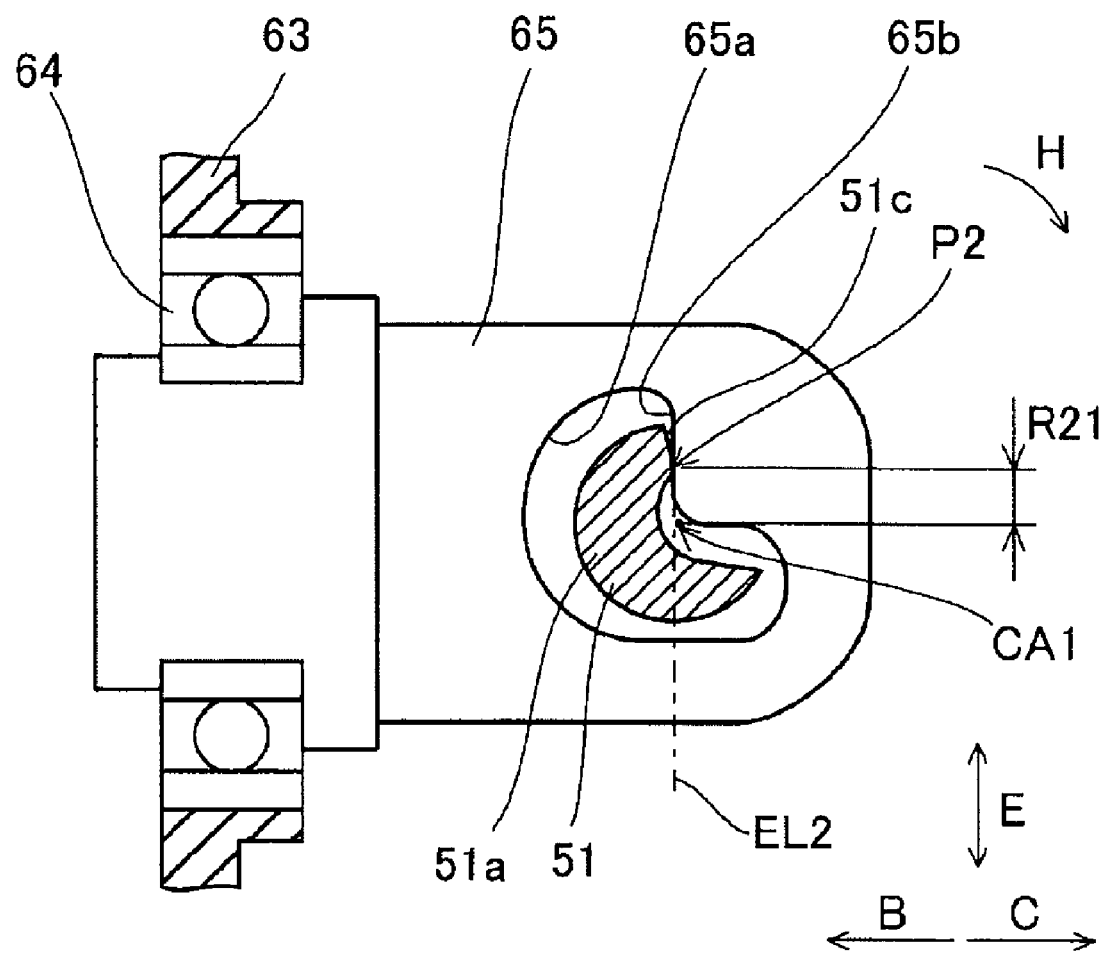

FIG. 16 is a sectional view taken along a line 300-300 of FIG. 15.

Figure 17:
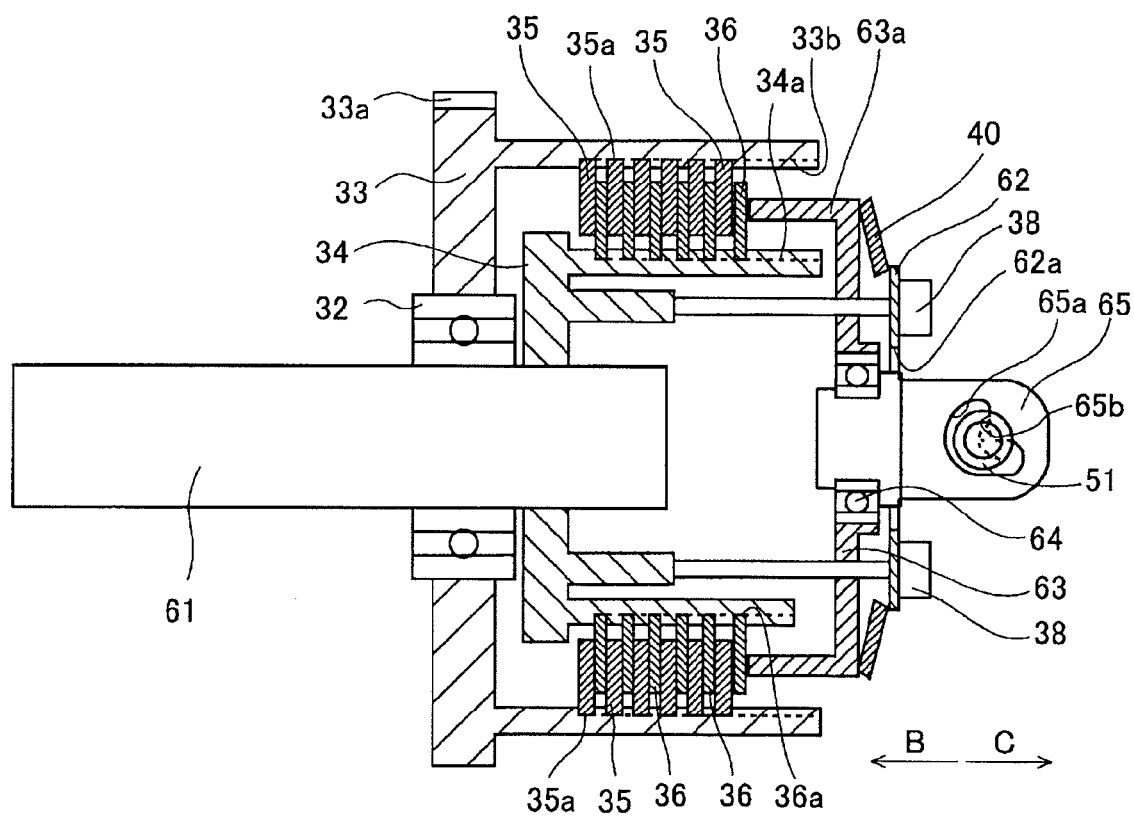

FIG. 17 is a sectional view showing a state of disengaging the clutch of the embodiment shown in FIG. 14.

Figure 18:
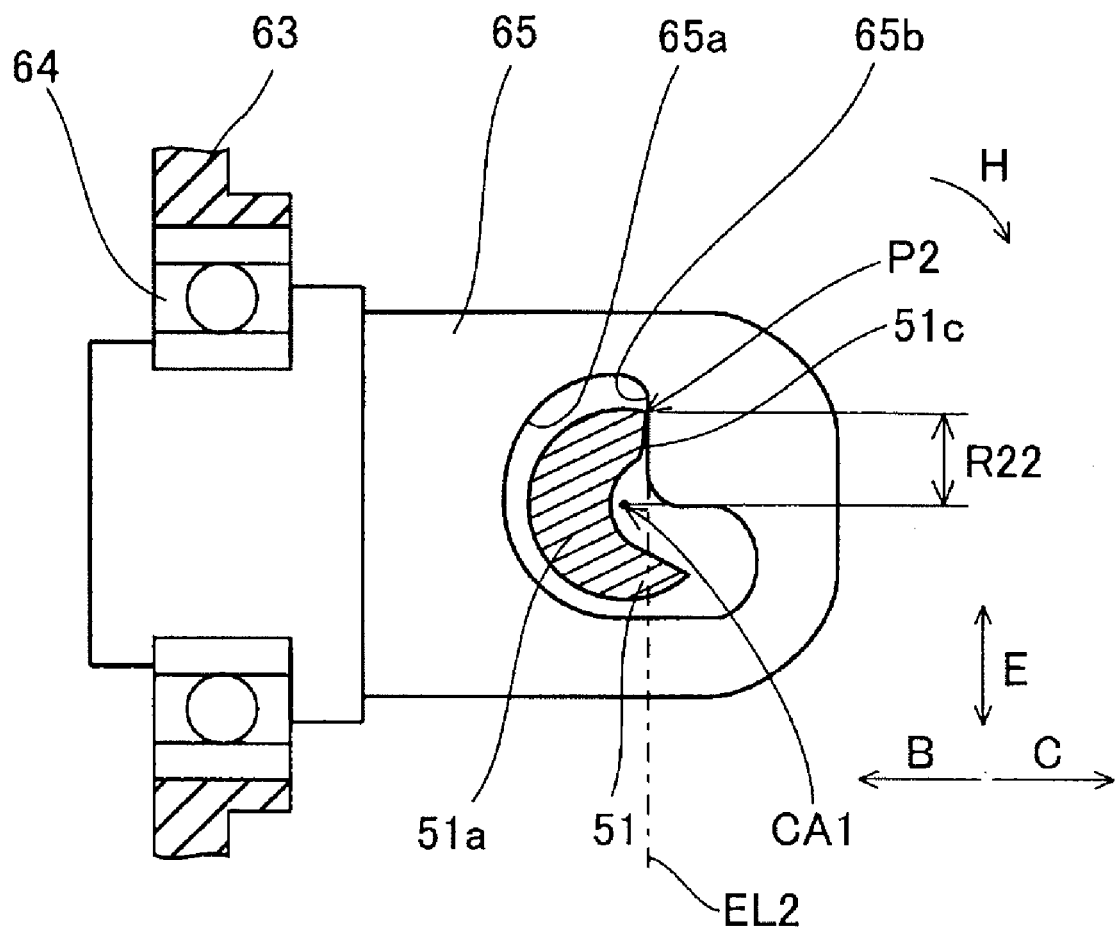

FIG. 18 is a detailed view of the state of disengaging the clutch of the embodiment shown in FIG. 14.

Figure 19:
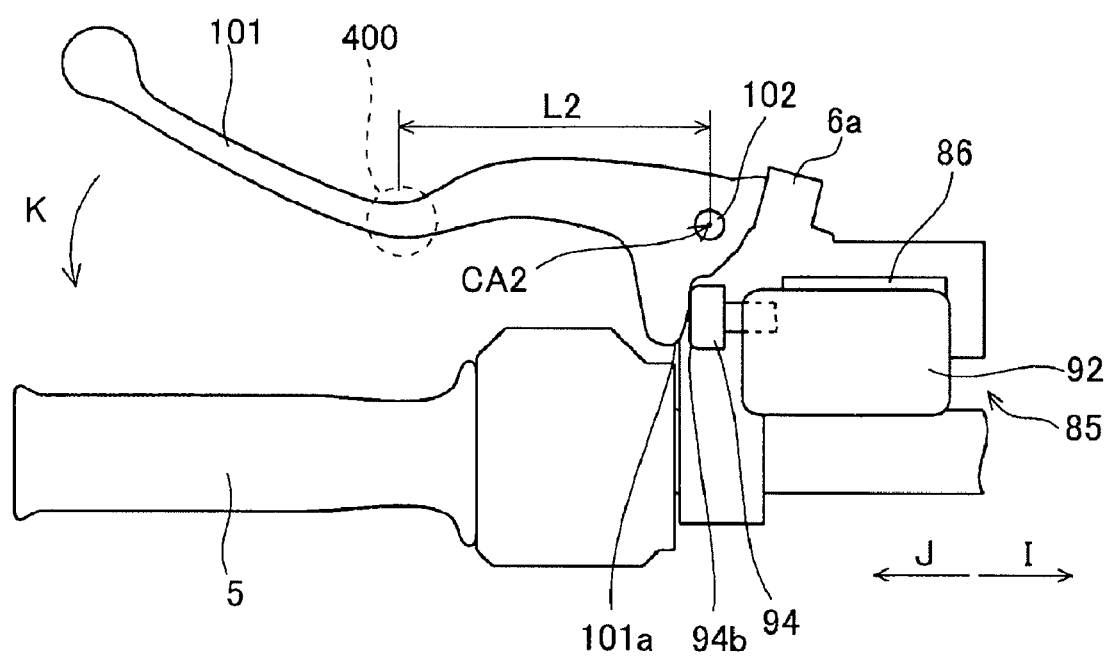

FIG. 19 is a side view showing a state of connecting another clutch system that is arranged and configured in accordance with certain features, aspects and advantages of the present invention.

Figure 20:
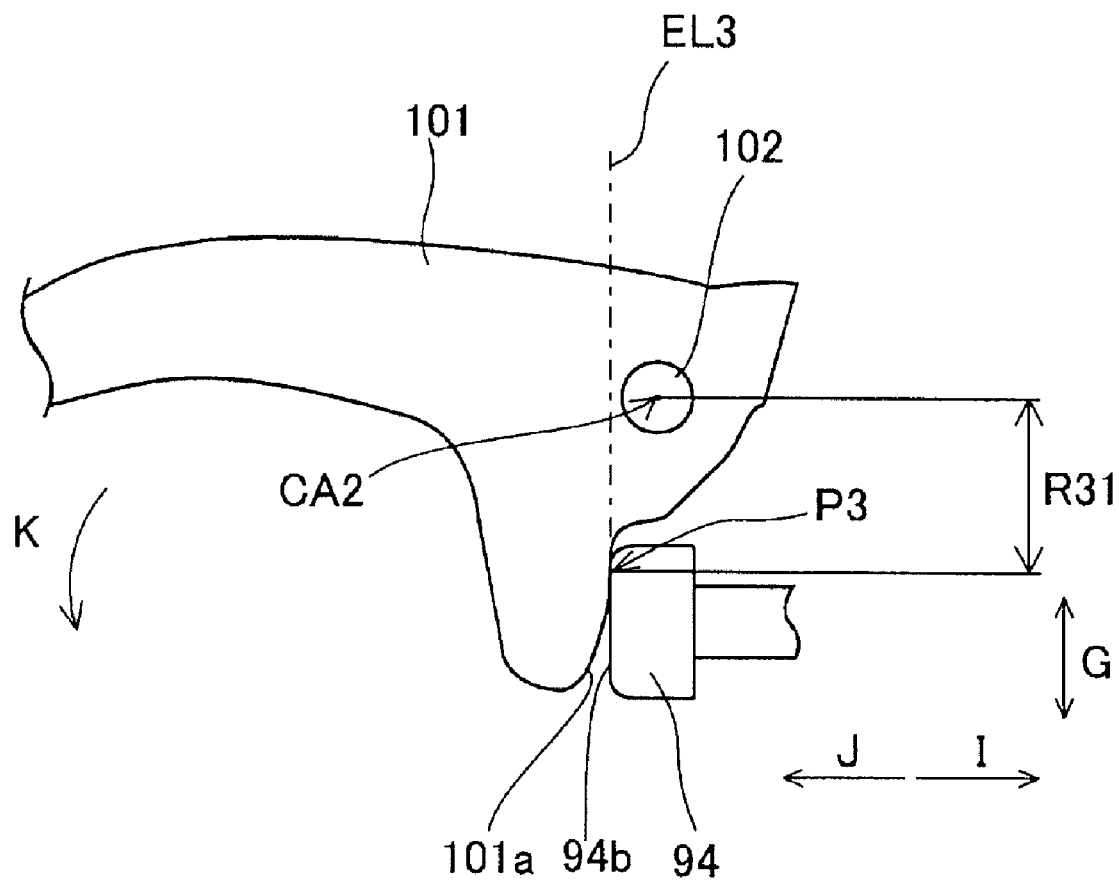

FIG. 20 is a detailed view of the state of engaging the clutch system of FIG. 19.

Figure 21:
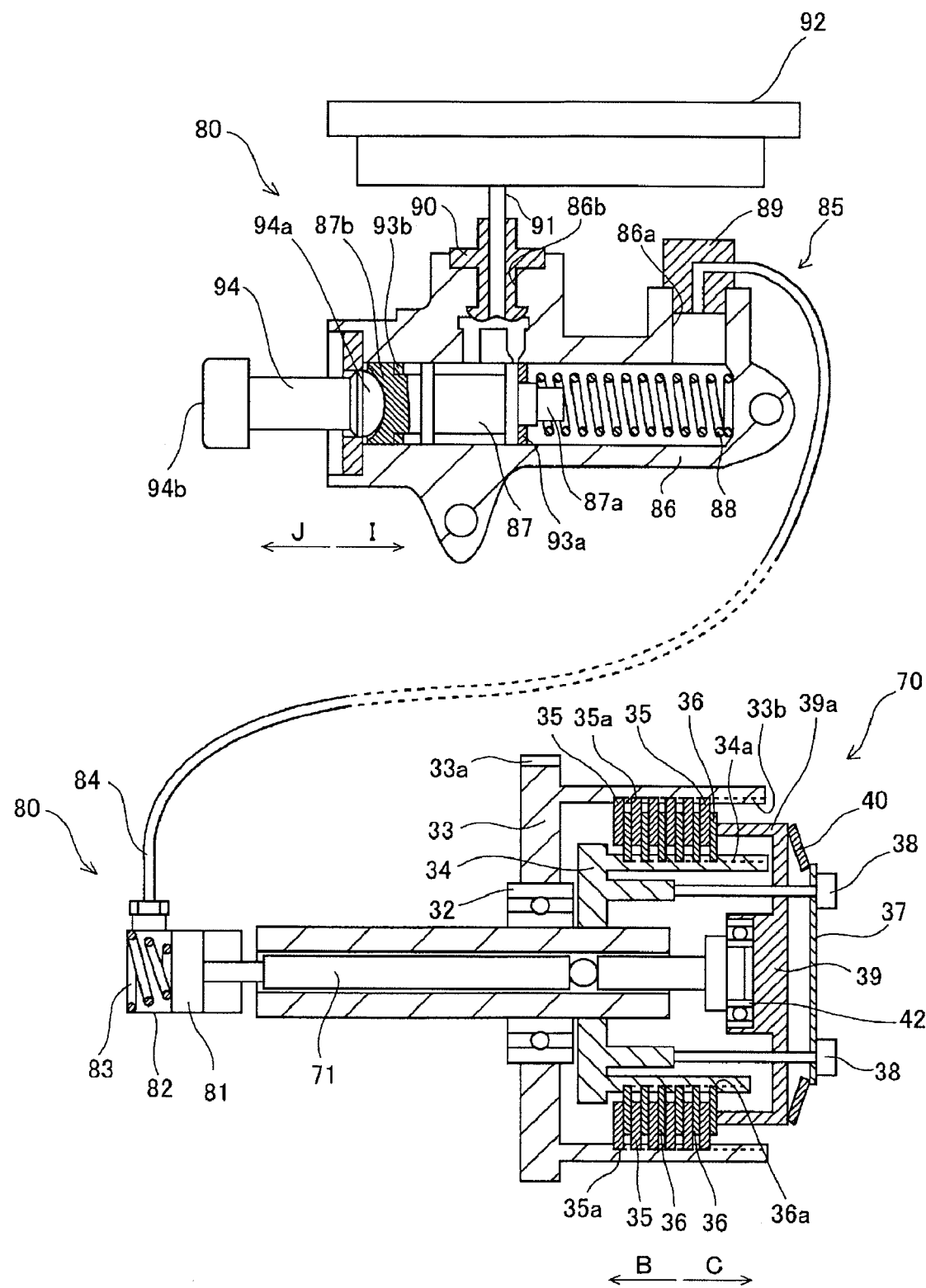

FIG. 21 is a detailed view of the state of engaging the clutch system of FIG. 19.

Figure 22:
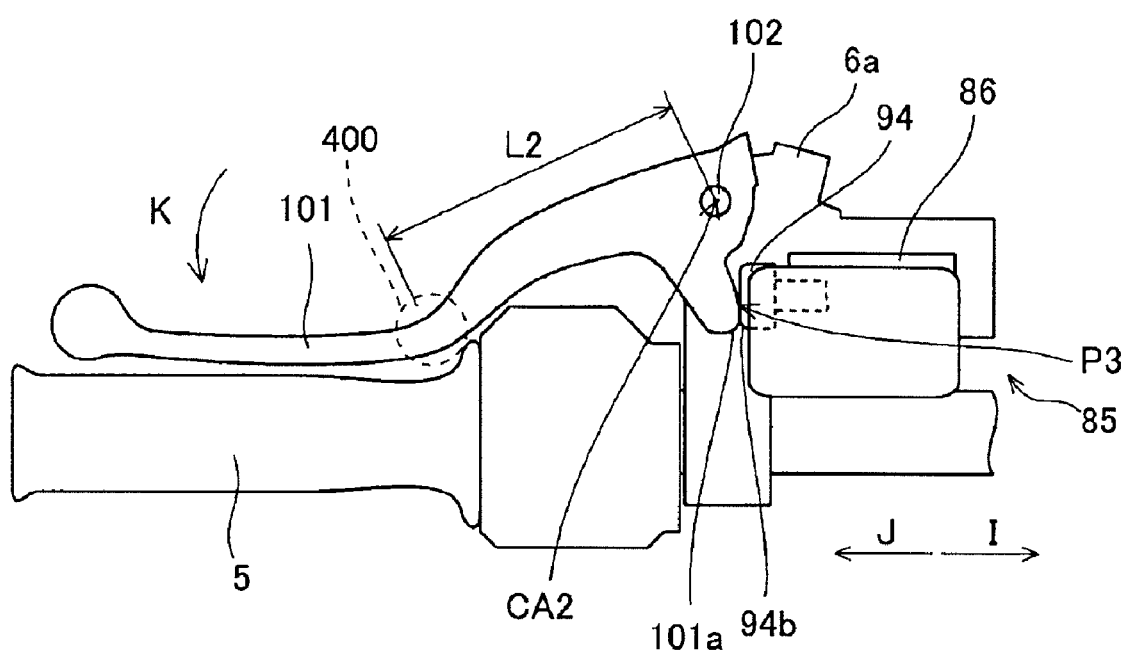

FIG. 22 is a side view showing a state of disengaging another clutch system that is arranged and configured in accordance with certain features, aspects and advantages of the present invention.

Figure 23:
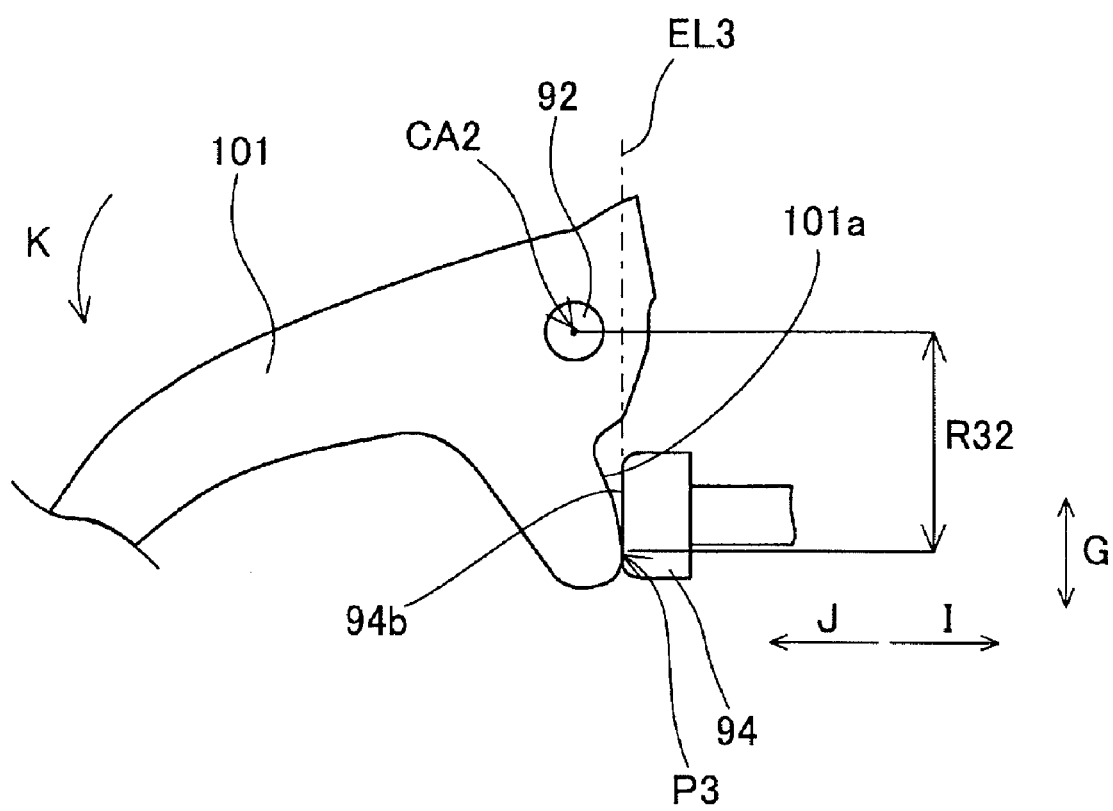

FIG. 23 is a detailed view of a state of disengaging the clutch system of FIG. 22.

Figure 24:
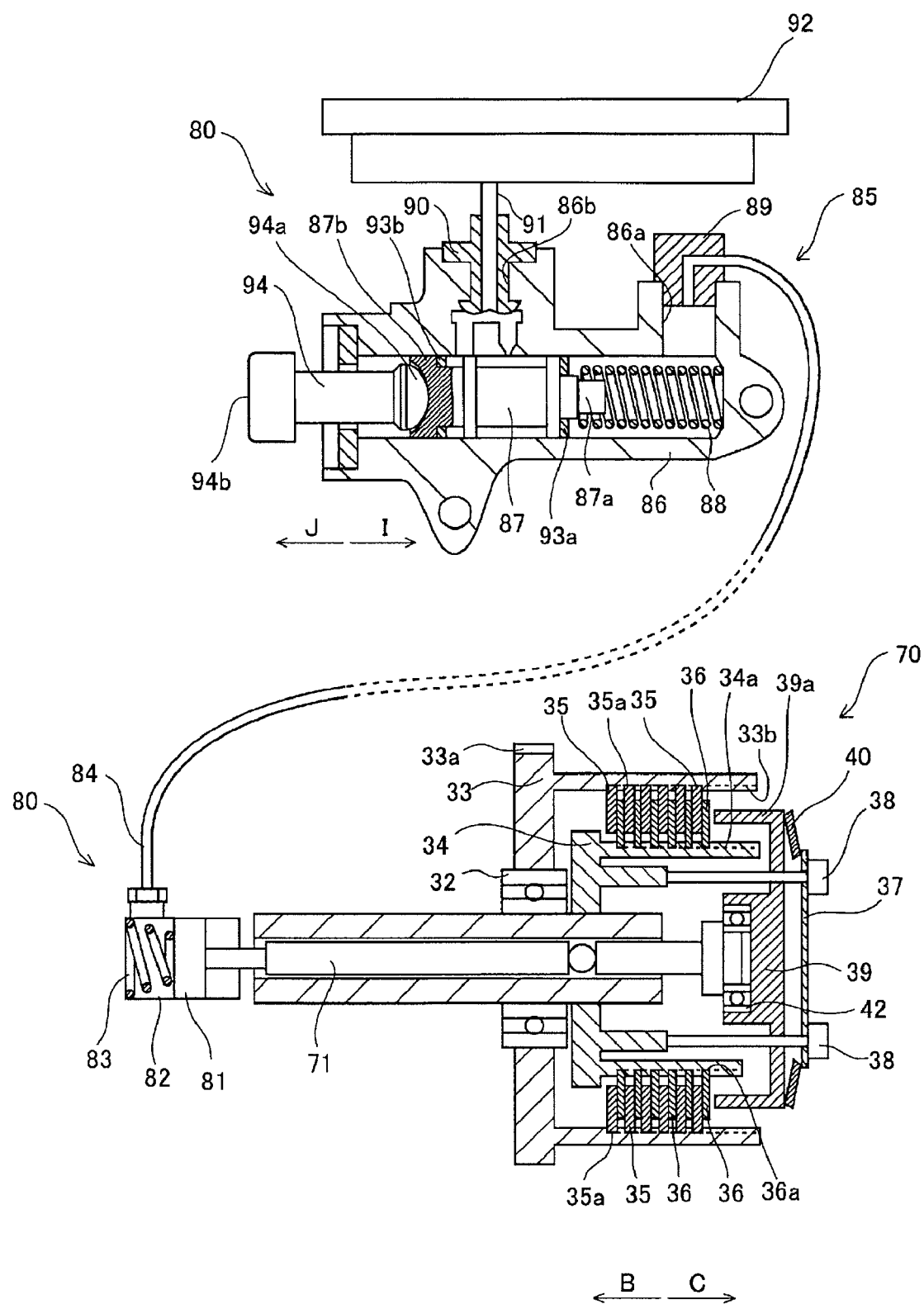

FIG. 24 is a detailed view of the state of disengaging the clutch system of FIG. 22.

Figure 25:
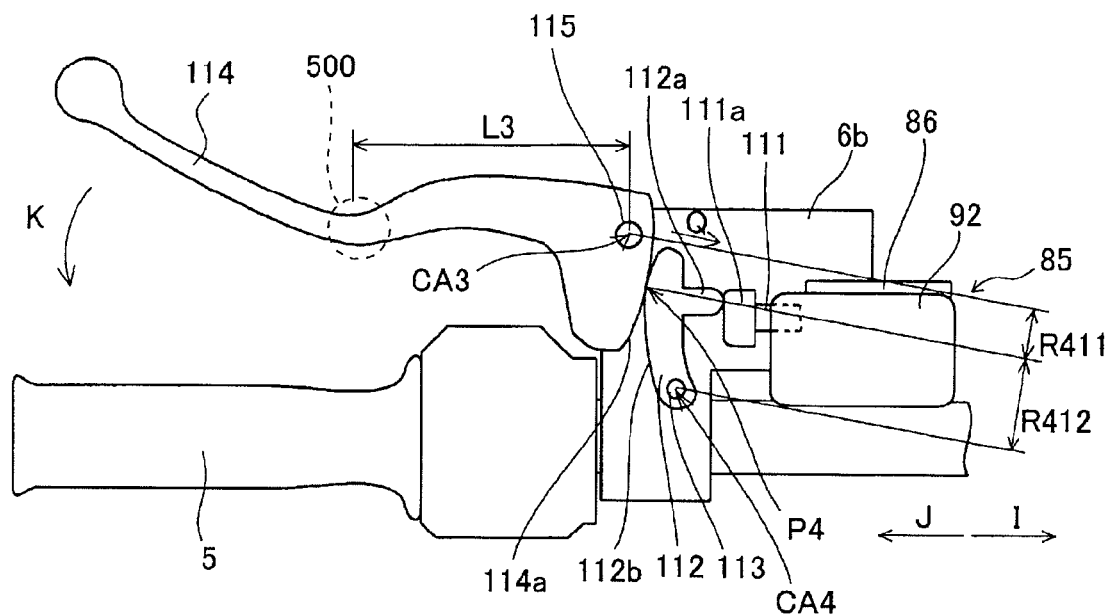

FIG. 25 is a side view showing a state of engaging a clutch system that is a modified version of the clutch system of FIG. 22.

Figure 26:
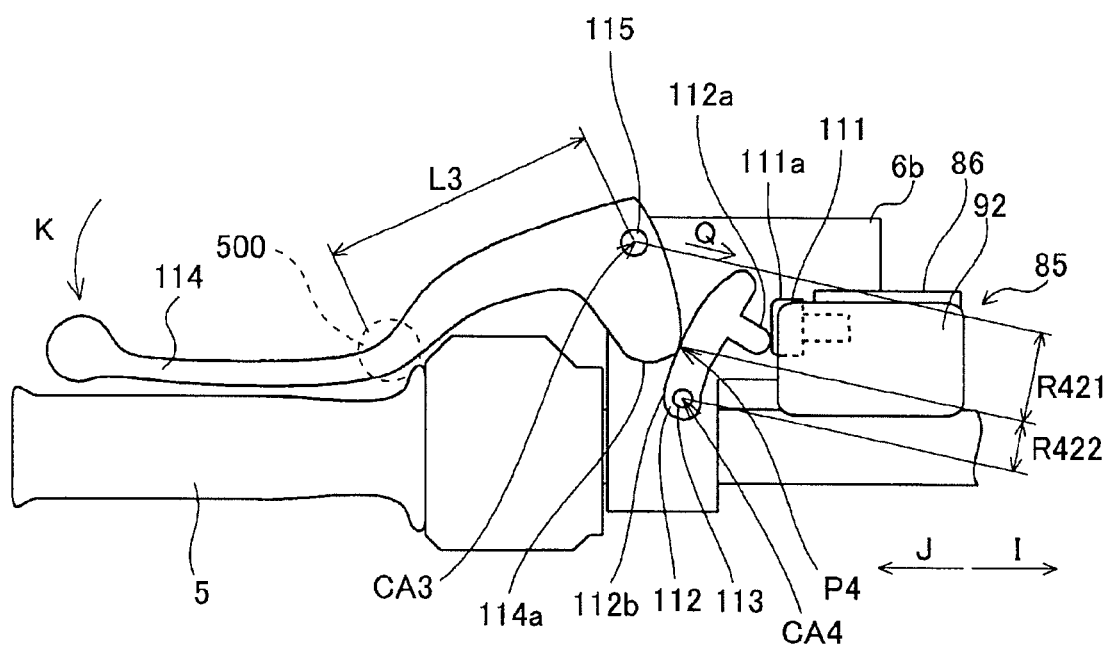

FIG. 26 is a side view showing a state of disengaging the clutch system of FIG. 25.

Figure 27:
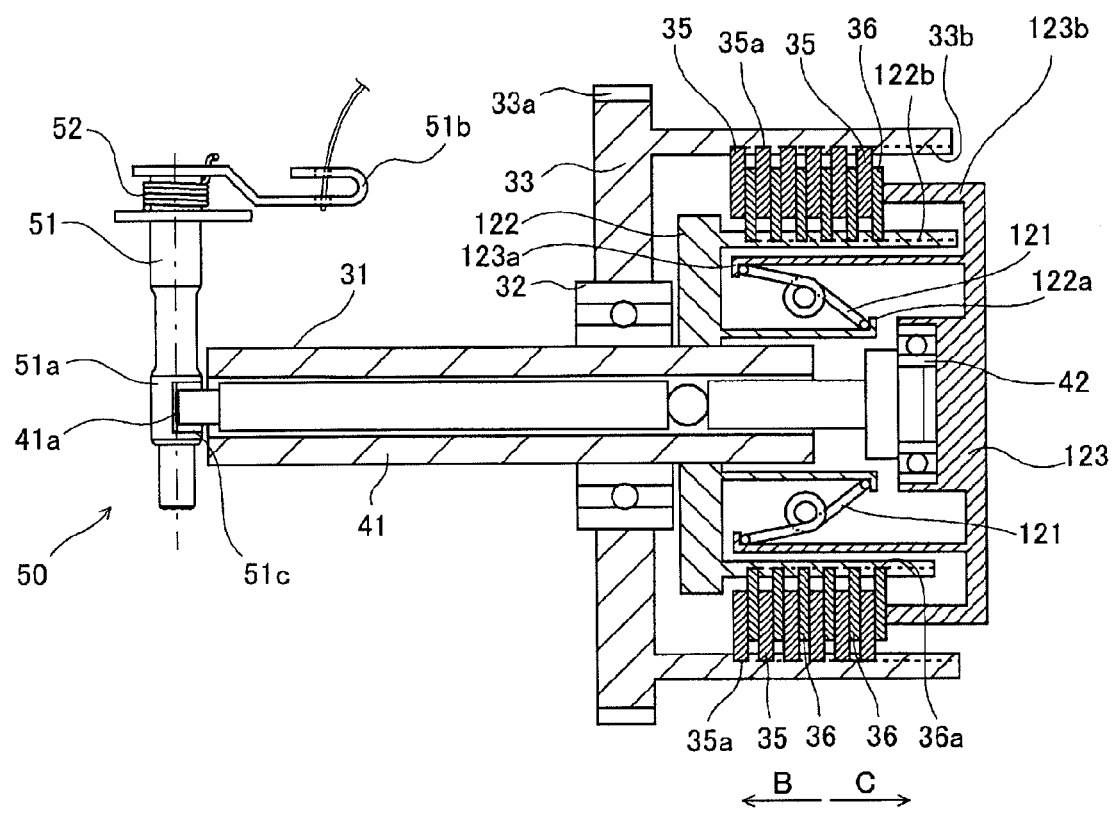

FIG. 27 is a sectional view showing a state of engaging a further clutch system that is arranged and configured in accordance with certain features, aspects and advantages of the present invention.

Figure 28:
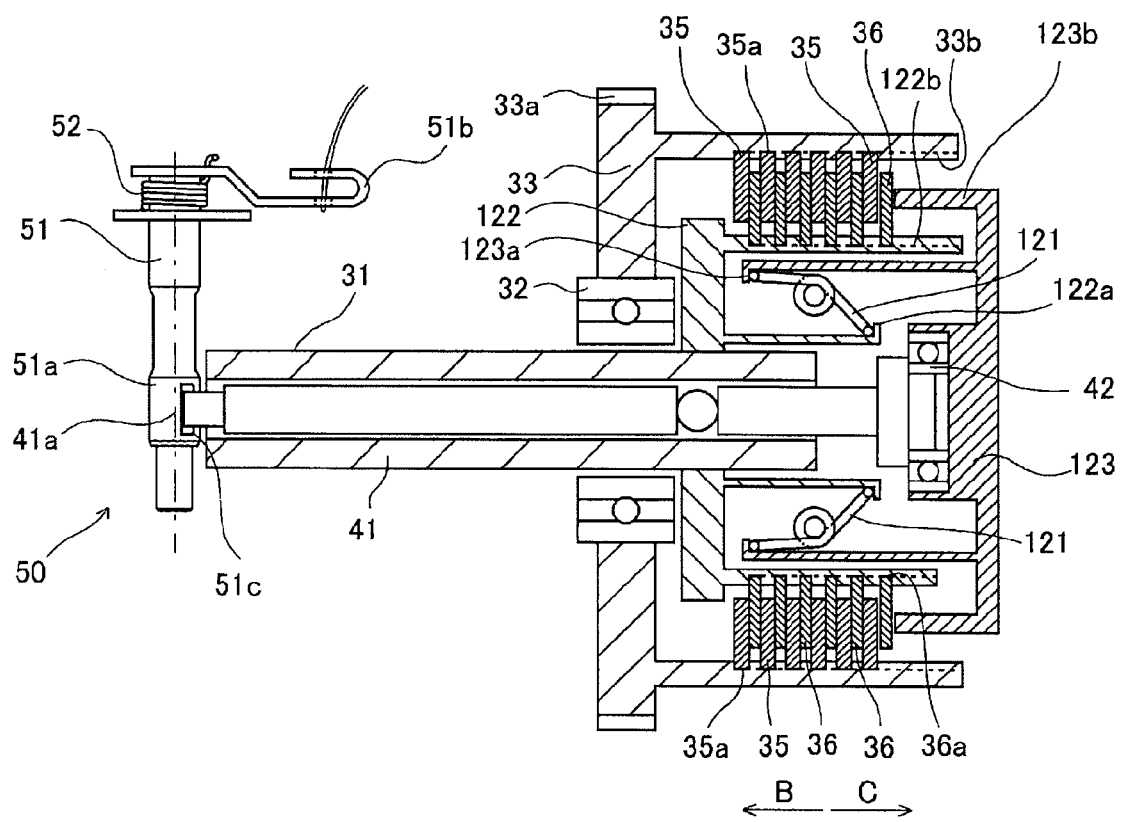

FIG. 28 is a sectional view showing a state of disengaging the clutch system of FIG. 27.

Figure 29:
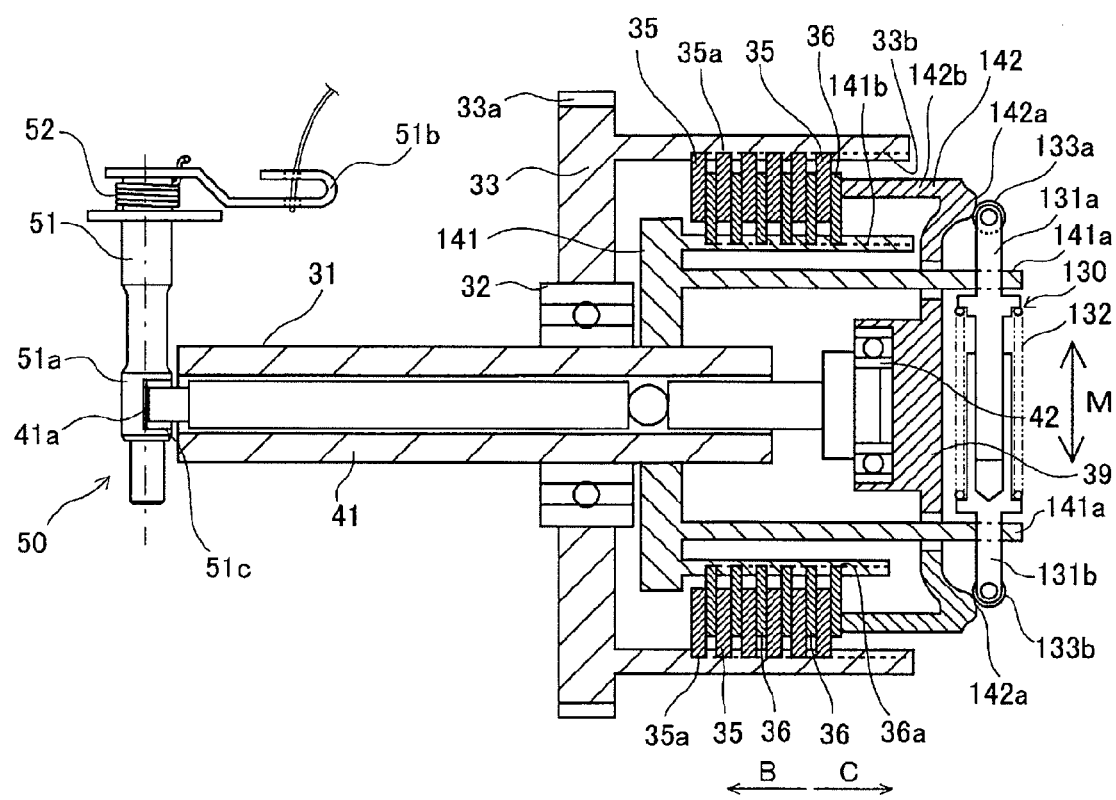

FIG. 29 is a sectional view showing a state of disengaging another clutch system that is arranged and configured in accordance with certain features, aspects and advantages of the present invention.

Figure 30:
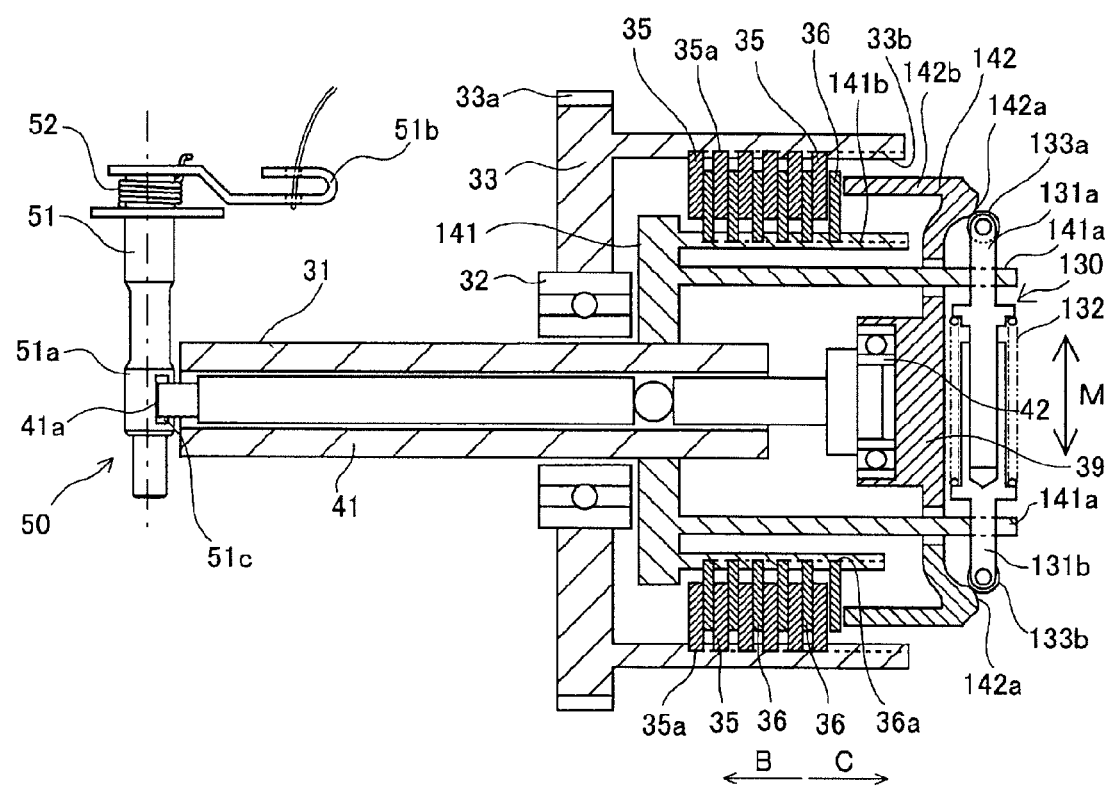

FIG. 30 is a sectional view showing a state of disengaging the clutch system of FIG. 29.

Figure 31:
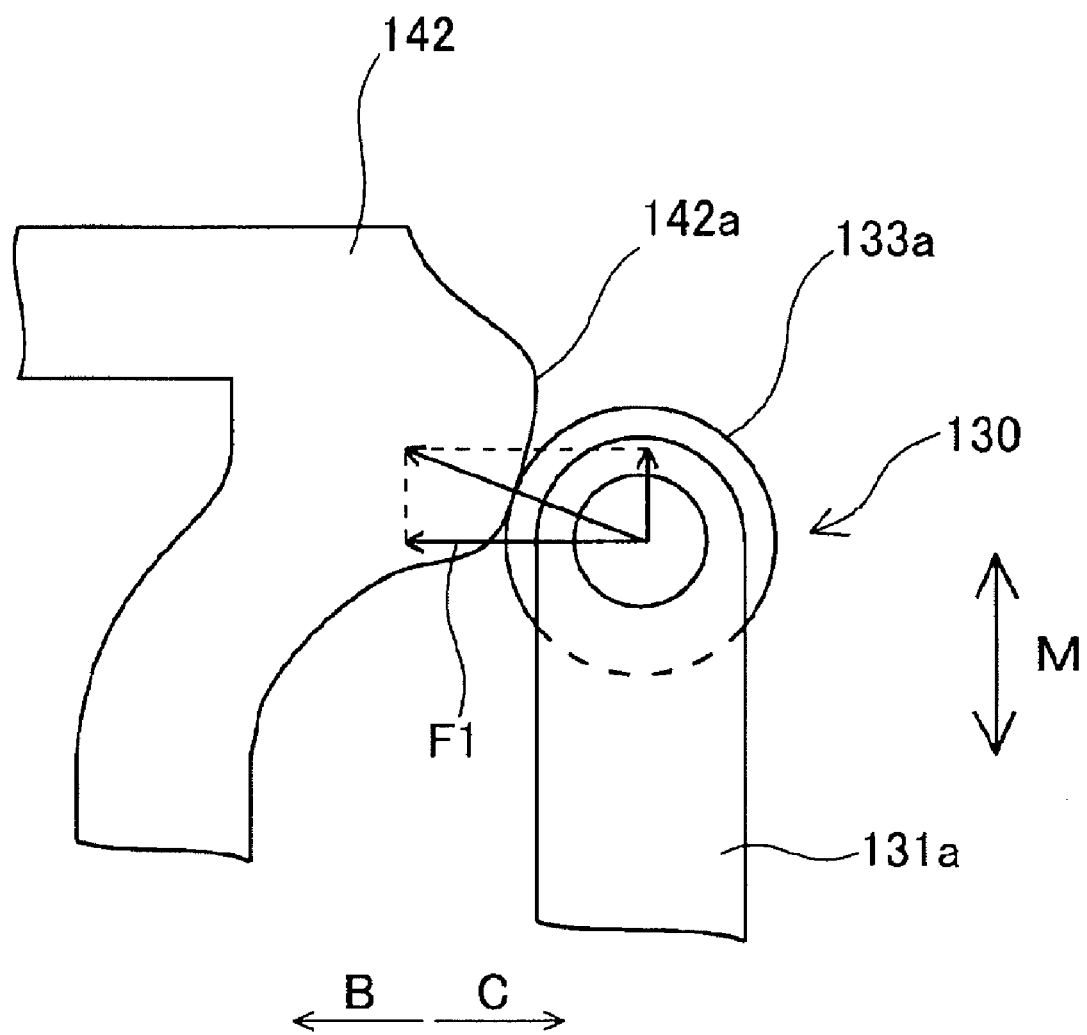

FIG. 31 is a detailed view of the state of engaging the clutch system of FIG. 29.

Figure 32:
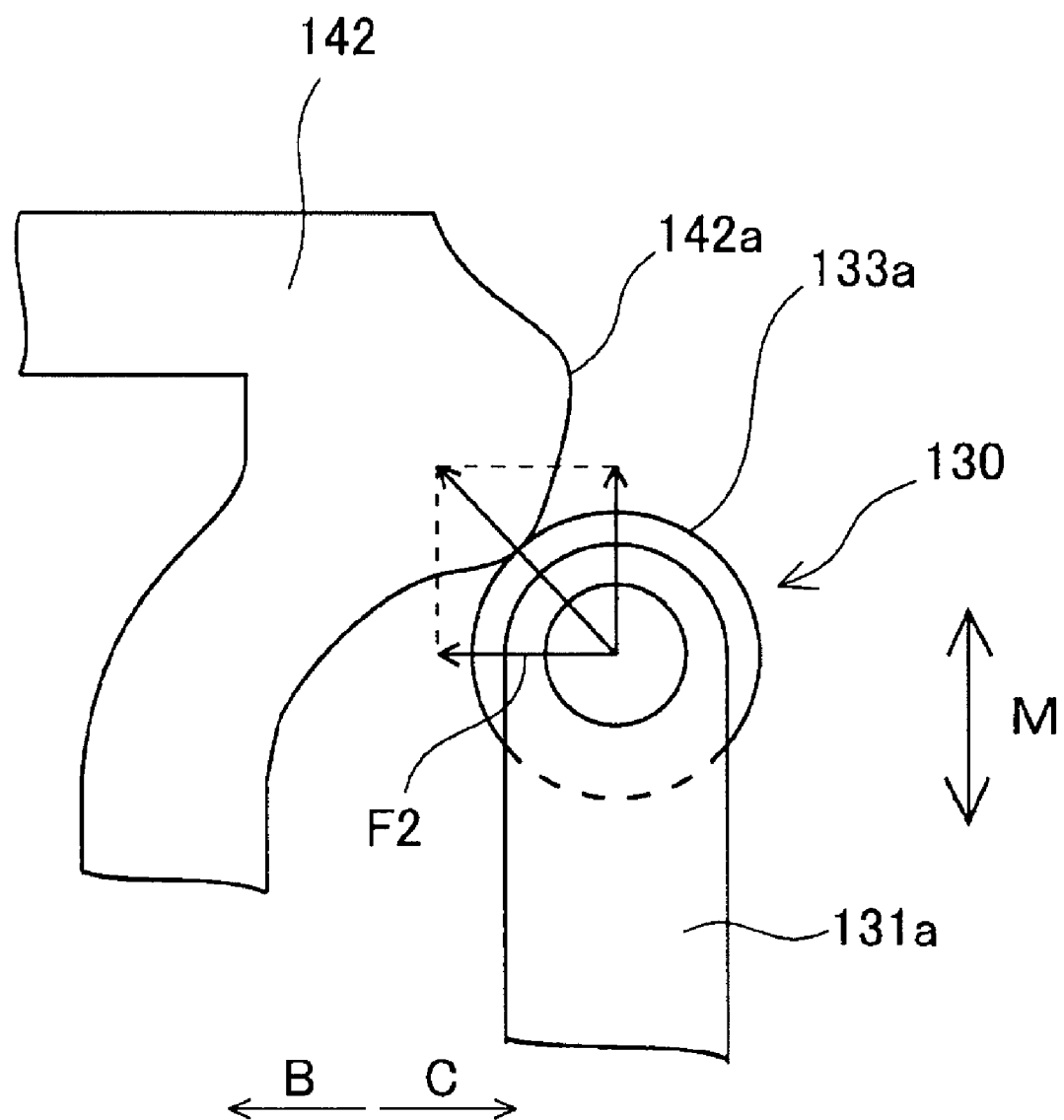

FIG. 32 is a detailed view of the state of disengaging the clutch system of FIG. 29.

DETAILED DESCRIPTION OF THE PREFERRED EMBODIMENT

Figure 1:
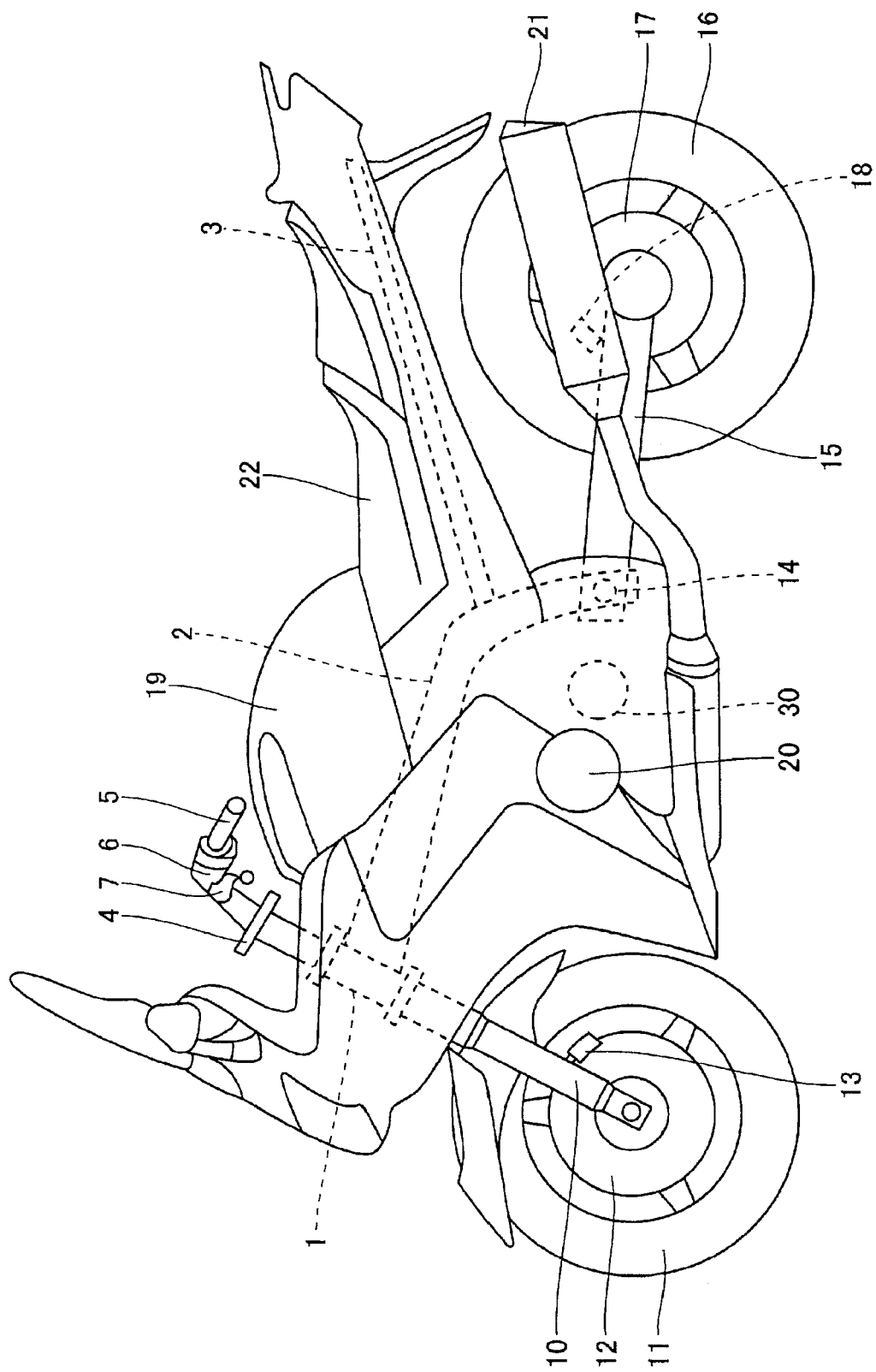
FIG. 1 is a side view showing a motorcycle comprising with an embodiment of a clutch system that is arranged and configured in accordance with certain features, aspects and advantages of the present invention.

With reference initially to FIG. 1, a motorcycle (vehicle) is shown that has a clutching system that is arranged and configured in accordance with certain features, aspects and advances of a first embodiment of the present invention. The motorcycle comprises a head pipe 1 that is connected with a forward portion of a main frame 2. The main frame 2 extends downward and rearward from the head pipe 1. A seat rail 3 extends upward from a rear portion of the main frame. The head pipe 1 pivotably supports a steering mechanism portion 4 and a handle 5 can be attached to an upper part of the steering mechanism portion 4.

With reference now to FIG. 2, a holder 6 is secured to the handle 5. A clutch lever 7 is pivotably attached to the holder 6. In the illustrated embodiment, a shaft 8 defines a fulcrum between the clutch lever 7 and the holder 6. A wire 9 connects to the clutch lever 7. At least a portion of the wire 9 is pulled when the clutch lever 7 is pivoted in a first direction A. The holder 6, the clutch lever 7, the shaft 8 and the wire 9 along with a push lever 51 and a coil spring 52 (described below) generally define a lever mechanism portion 50.

A front fork 10 connects to a lower part of the steering mechanism portion 4. A front wheel 11 is rotatably connected to a lower end of the front fork 10. A front disk rotor 12 is connected to the front wheel such that the front wheel 11 and the front disk rotor 12 rotate together. A front caliper 13 connects to the front fork 10. The front fork 10 is positioned to pinch the front disk rotor 12.

A front end of a swing arm 15 connects to a rear end of the main frame 2. A pivoting axis 14 connects the swing arm 15 and the main frame 2. A rear end of the swing arm 15 rotatably supports a rear wheel 16. A rear disk rotor 17 can be attached to the rear wheel 16. The rear disk rotor 17 and the rear wheel 16 rotate together. A rear caliper 18 connects to the swing arm 15. The rear caliper 18 is positioned to pinch the rear disk rotor 17. An upper portion of the main frame 2 supports a fuel tank 19. An engine 20 can be mounted on a lower side of the main frame 2. A muffler 21 connects to the engine 20. A seat can be supported by an upper side of the seat rail 3.

A clutch mechanism portion 30 mounts to a lower side of the main frame 2. As shown by FIG. 2, the clutch mechanism portion 30 can include a bearing 32 that supports a generally cylindrical main shaft 31 within a clutch housing 33. That is, the clutch housing 33 preferably is rotatably attached to the main shaft 31. A gear portion 33a can be formed in an outer peripheral face of the clutch housing 33. The gear portion 33a of the clutch housing 33 preferably meshes with a gear 20a that is attached to a crankshaft 20a of the engine 20. An inner peripheral face of the clutch housing 33 preferably comprises a plurality of groove portions 33b. The groove portions 33b preferably are spaced along an axial direction (indicated as B direction and C direction) relative to the main shaft 31.

A clutch boss 34 can be formed with or connected to the main shaft 31. The clutch boss 34 and the main shaft 31 preferably rotate together as a single component. In other words, the clutch boss 34 and the main shaft are rotationally coupled together. The clutch boss 34 is positioned inside of the clutch housing 33. Further, an outer peripheral face of the clutch boss 34 is configured to oppose the inner peripheral face of the clutch housing 33, which inner peripheral face comprises the groove portions 33b. The outer peripheral face of the clutch boss 34 can be formed with a spline portion 34a that extends in the axial direction of the main shaft 31 (i.e., the direction indicated as B direction and C direction).

A plurality of friction disks 35 are positioned inside of the clutch housing 33 along with a generally corresponding plurality of clutch disks 36. In the illustrated configuration, the clutch disks 36 are individually interposed between each pair of friction disks 35. The friction disks 35 and the clutch disks 36 preferably comprise a generally circular ring-shaped configuration.

In the illustrated embodiment, an outer peripheral face of each friction disk 35 is formed with a plurality of projected portions 35a and the projected portion 35a engages with the groove portion 33b of the inner peripheral face of the clutch housing 33. Each friction disk 35 is axially movable along the groove portion 33b of the clutch housing 33. An inner peripheral face of each illustrated clutch disk 36 preferably comprises a splined portion 36a that meshes with the spline portion 34a of the outer peripheral face of the clutch boss 34. The clutch disk 36 is axially movable along the spline portion 34a of the clutch boss 34. As mentioned, the plurality of friction disks 35 and the plurality of clutch disks 36 are alternately arranged in the axial direction and preferably define rotating plates.

One or more bolts 38 connect a support plate 37 to an axial end of the illustrated clutch boss 34. A pressure plate 39 is positioned between the clutch boss 34 and the support plate 37. The pressure plate 39 comprises a pressing portion 39a that presses the clutch disk 36 in B direction. Thus, the pressure plate 39 defines, at least in part, a pressing member. A Belleville spring 40 can be positioned between the support plate 37 and the pressure plate 39. The Belleville spring 40 acts as a clutch spring and defines an urging member. Other configurations are possible.

When the clutch is engaged, the clutch disk 36 is pressed in the B direction by the pressing portion 39a of the pressure plate 39. Movement of the clutch disk 36 is caused by urging the pressure plate 39 in the B direction, such as through the Belleville spring 40. In other words, the normal position for the clutch is an engaged position. Because the clutch disk 36 is pressed in B direction, the clutch disk 36 and the friction disk 35 are brought into contact with each other. When the clutch housing 33 is rotated while the clutch disks 36 and the friction disks 35 are in contact, the clutch boss 34 rotates with the clutch housing 33 through the friction forces generated between the clutch disks 36 and the friction disks 35. Thus, when the clutch is engaged, the main shaft 31 rotates with the crankshaft 20a.

With continued reference to FIG. 2, a push rod 41 can be positioned inside of at least a portion of the main shaft 31. The push rod 41 presses against the opposite side of the pressure plate 39 relative to the Belleville spring 40. Thus, the push rod 41 can move the pressure plate 39 in the C direction. Thus, the push rod 41 can define a relay member but other relay members also can be used. A bearing 42 preferably connects an end portion of the push rod 41 to the pressure plate 39.

Figure 6:
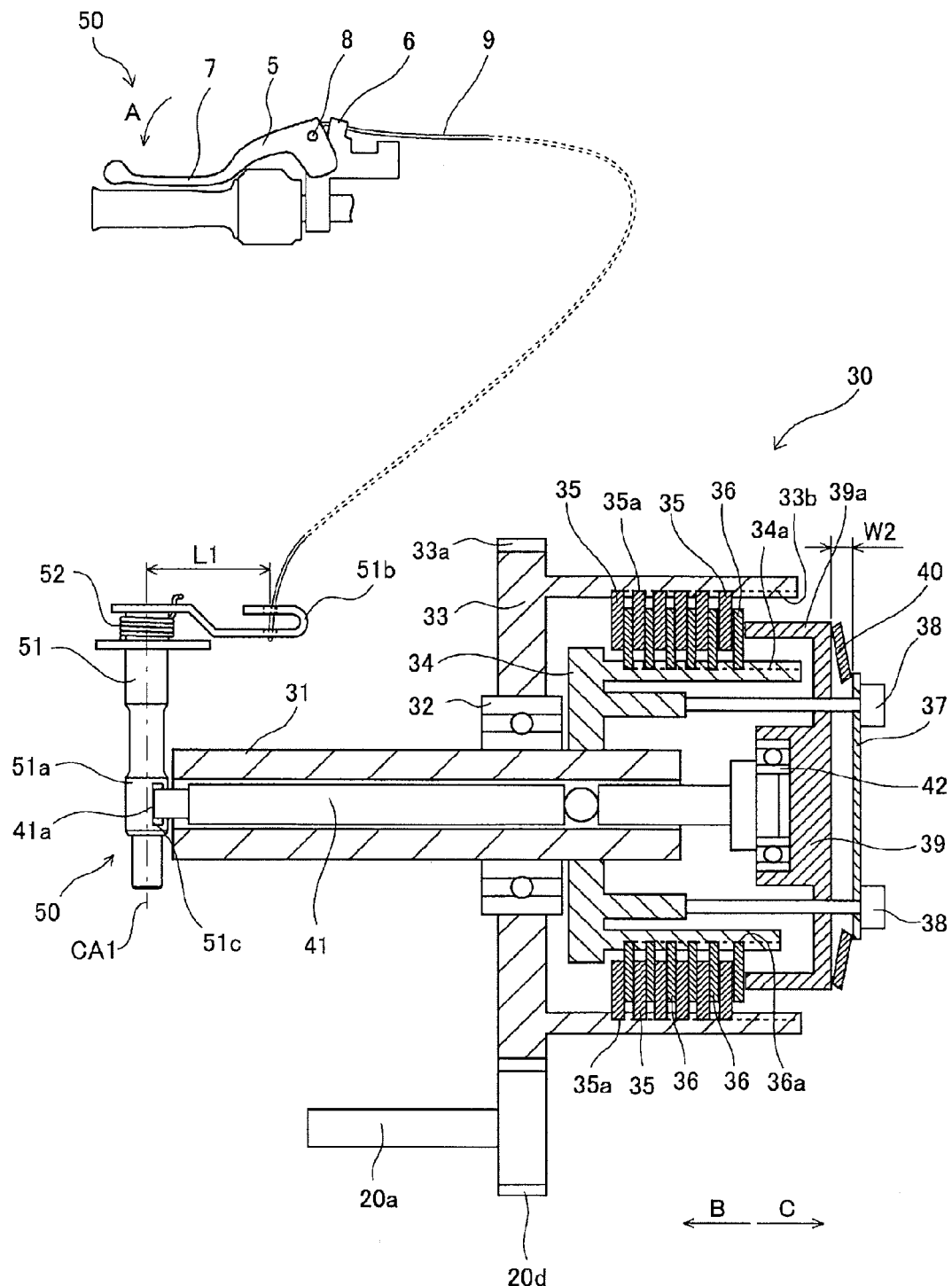
FIG. 6 is a view showing a state of disengaging the clutch system of FIG. 2.

When the pressure plate 39 moves in the C direction through movement of the push rod 41, the clutch is disengaged. Specifically, as shown in FIG. 6, when the clutch is disengaged, the pressure plate 39 is moved by the push rod 41 in the C direction against the biasing force of the Belleville spring 40. Because the pressure plate 39 is moved in the C direction, the clutch disk 36 is no longer moved in the B direction by the pressing portion 39a of the pressure plate 39. Therefore, the clutch disks 36 and the friction disks 35 are able to move in the C direction and, therefore, the clutch disks 36 and the friction disks 35 can separate from each other. When the clutch housing 32 is rotated, the friction force is not sufficiently generated between the clutch disks 36 and the friction disks 35. Thereby, when the clutch is disengaged, the main shaft 31 and the clutch boss 34 are not coupled for rotation and only the clutch housing 33 rotates with the crankshaft 20a.

With reference again to FIG. 2, an end of the push rod 41 opposite to the end that biases the pressure plate 39 projects in the B direction from inside of the main shaft 31. A cam follower 41a can be formed on the end of the push rod 41 or can be connected to, or merely abut, the end of the push rod 41. The cam follower can contact a cam surface 51c of a push lever 51. The cam follower 41a preferably defines an example of a second contact portion.

Figure 3:
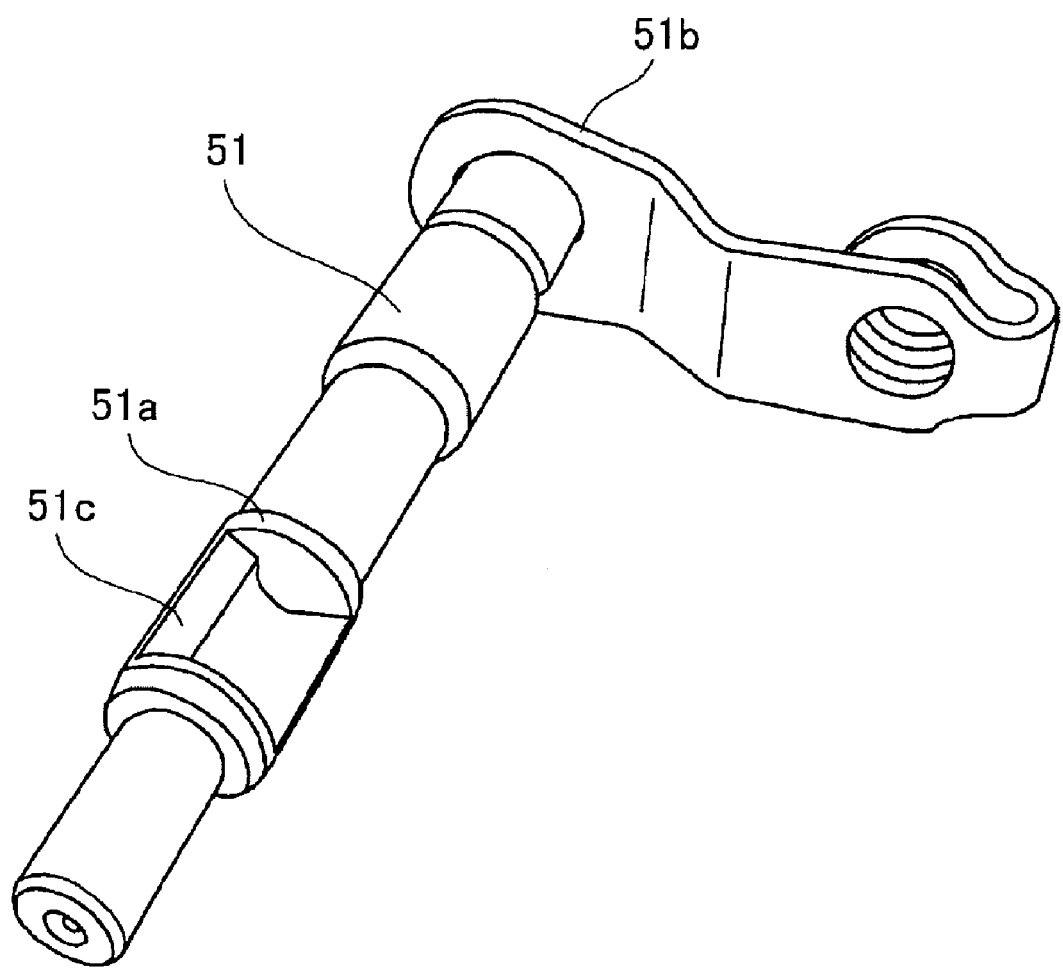
FIG. 3 is a perspective view of a push lever of the clutch system of FIG. 2.
Figure 4:
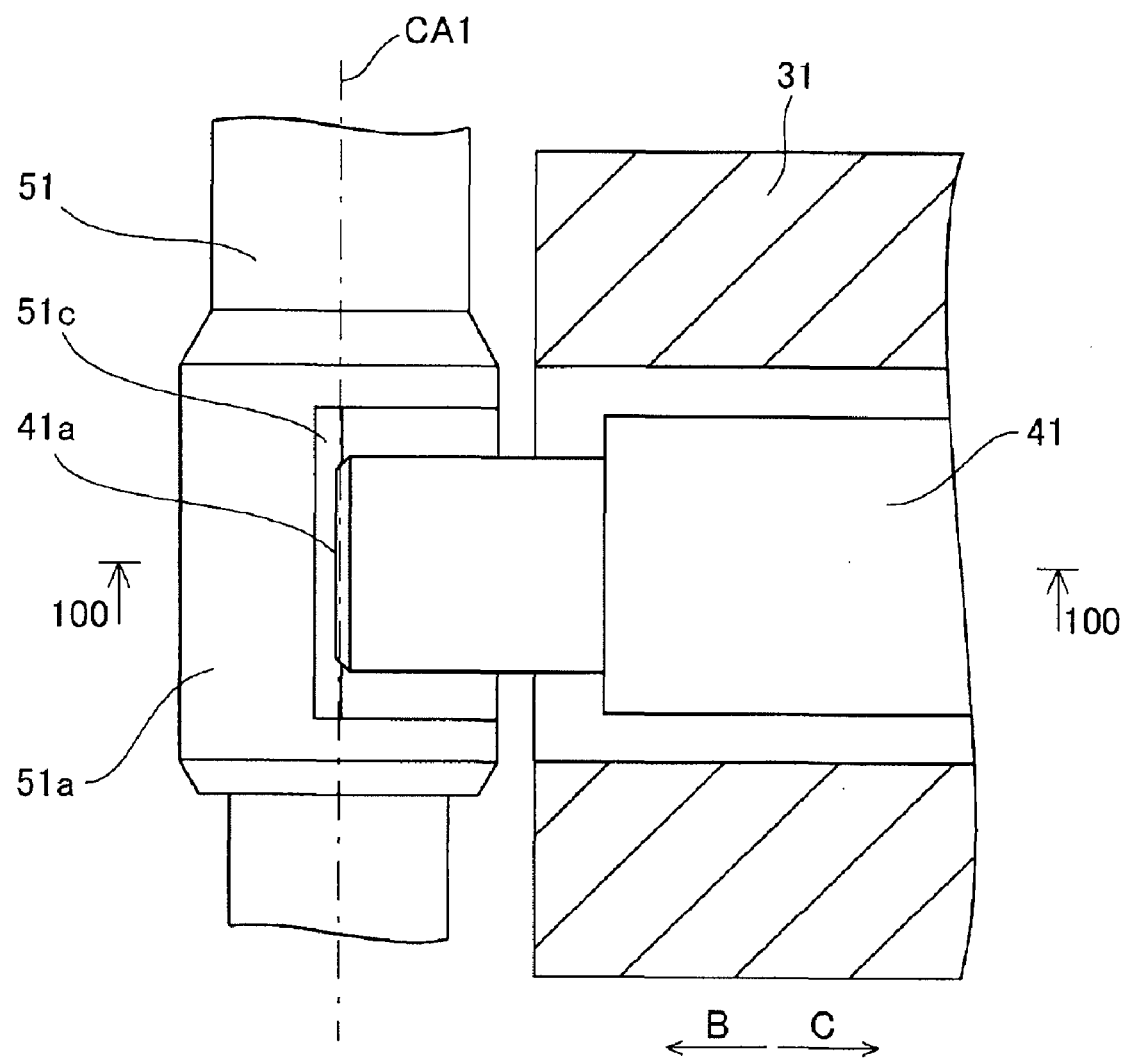
FIG. 4 is a detailed view of the state of engaging the clutch system of FIG. 2.
Figure 5:
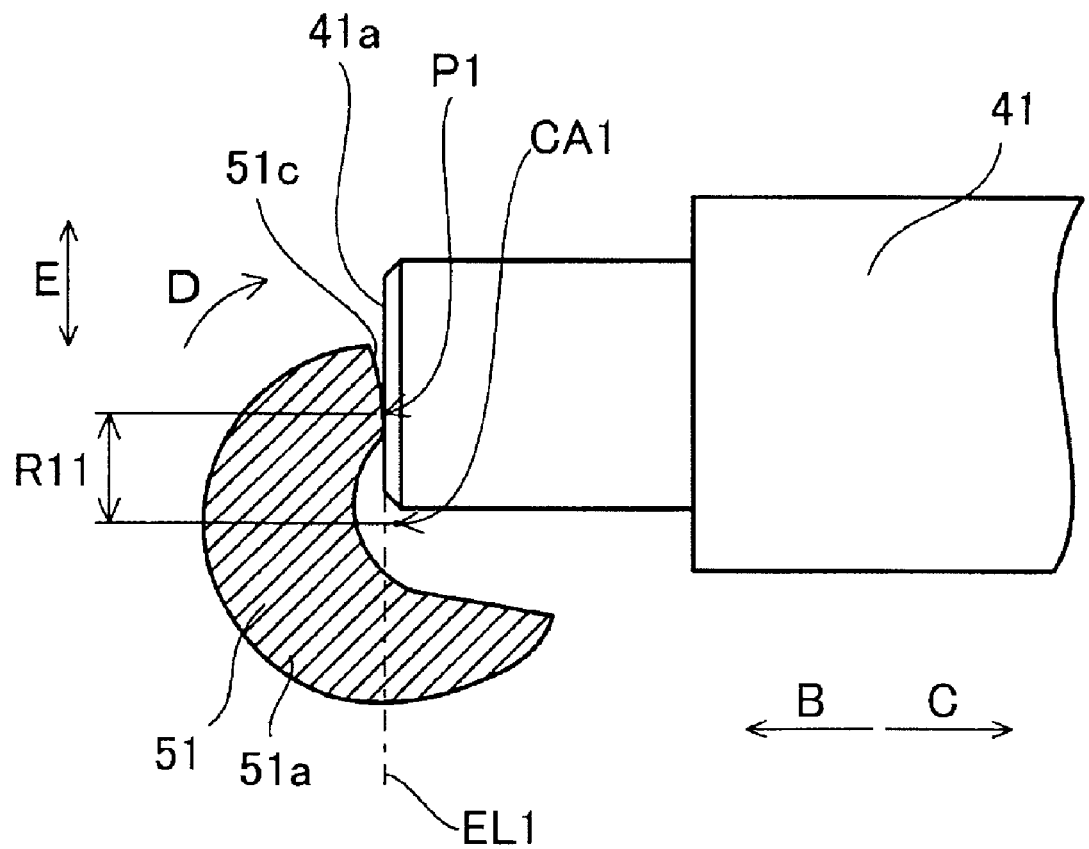
FIG. 5 is a sectional view taken along a line 100-100 of FIG. 4.

The push lever 51 presses the push rod 41c in the C direction. The push lever 51 preferably is positioned on the cam follower side of the push rod 41. The push lever 51 can define an example of a lever and a pivoting lever. As shown by FIG. 2 and FIG. 3, the push lever 51 can comprise a rod portion 51a and an attaching portion 51b that is arranged at one end of the rod portion 51a. The attaching portion 51b and, in some configurations, the rod portion 51a, preferably define a fulcrum through a center axis (pivoting axis) CA1. As shown in FIG. 3 through FIG. 5, the rod portion 51a of the push lever 51 comprises the cam 51c that contacts the cam follower 41a. The cam 51c defines an example of a first contact portion. By pivoting the push lever 51 (cam 51c) in the D direction from the position shown in FIG. 4 and FIG. 5 (i.e., a pivot start position that corresponds to a clutch engaged position—a clutch disengagement start position), the push rod 41, and more particularly the cam follower 41a, is moved in the C direction. By causing movement to the position shown in FIG. 7 and FIG. 8 (i.e., a pivot finish position that corresponds to a disengaged position—a clutch disengagement completed position) through movement of the push lever 51, and more particularly the cam 51c, in the D direction from the position shown in FIG. 4 and FIG. 5, the clutch is assumes a disengaged position (see FIG. 6) from an engaged position (see FIG. 2).

With reference to FIG. 2, the wire 9 preferably connects to the attaching portion 51B of the push lever 51 at a location offset from the pivoting axis CA1 by a distance L1. Thereby, when the wire 9 is pulled by operating the clutch lever 7, the push lever 51 is rotated in the D direction (refer to FIG. 5). A torsion coil spring 52 can be mounted to one end of the rod portion 51a of the push lever 51. The torsion coil spring 52 urges the push lever 51 in the D direction (refer to FIG. 5). Together, the push lever 51 and the coil spring 52 can comprise at least a portion of the lever mechanism portion 50 used to disengage the clutch.

The cam 51c of the push lever 51 and the cam follower 41a of the push rod 41 preferably are formed such that a lever ratio at the pivot start position of the push lever 51 (i.e., the clutch disengaging operation start position) is larger than a lever ratio at the pivot finish position of the push lever 51 (i.e., the clutch disengaging operation finish position). Specifically, in one configuration, at the pivot start position of the push lever 51, as shown in FIG. 5, a distance R1 from the pivoting axis CA1 of the push lever 51 to a position P1 at which the cam 51c and the cam follower 41a are brought into contact with each other in a direction E that is generally orthogonal to the axial direction of the push rod 41 is about 2.9 mm. On the other hand, at the pivot finish position of the push lever 51 (i.e., the clutch disengaging operation finish position), as shown in FIG. 8, a distance R12 from the pivoting axis CA1 to the contact position P1 is about 5.0 mm. Therefore, a lever ratio (L1/R11) at the pivot start position (i.e., the clutch disengaging operation start position) is larger than a lever ratio (L1/R12) at the pivot finish position (i.e., the clutch disengaging operation finish position). Note that the contact position P1 in the illustrated configuration moves generally outward as the lever 51 rotates.

With reference to FIG. 5, at the pivot start position of the push lever 51, an extension EL1 is radially spaced in the direction (E direction) orthogonal to the axial direction (C direction) of the push rod 41 relative to the contact position P1 of the cam 51c. Preferably, the extension EL1 extends such that it overlaps with a portion of the cam follower 41a. In the illustrated configuration, the cam follower 41a extends beyond the pivoting axis CA1 of the push lever 51 such that the distal end of the cam follower 41a, which distal end contains the contact position P1, overlaps more than one half of the diameter of the lever 51 when viewed in cross section. With reference to FIG. 8, when the push lever 51 reaches the pivot finish position by being pivoted in the D direction, the extension EL1 and the cam follower 41a are moved to the opposite side of the pivoting axis CA1 of the push lever 51. In other words, in moving through its full stroke, the cam follower 41a and the contact position P1 cross from one side of the pivot axis CA1 to the other side.

With reference to FIG. 2 and FIG. 6, the Belleville spring 41 preferably is formed such that a force applied to the push lever 51 (i.e., to the cam 51c) at the pivot finish position of the push lever 51 (i.e., the clutch disengagement operation finish position) is smaller than a force applied to the push lever 51 (i.e., to the cam 51c) at the pivot start position of the push lever 51 (i.e., the clutch disengagement operation start position).

The Belleville spring (i.e., clutch spring) 40 generally comprises a spring characteristic such as that shown in FIG. 9. A broken line in FIG. 9 indicates a spring constant. As shown in FIG. 9, when an amount of bending experienced by one preferred Belleville spring 40 is equal to or smaller than about 1.6 mm, the biasing force of the Belleville spring 40 gradually increases in an amount corresponding to an increase in the bending amount. On the other hand, when the bending is larger than about 1.6 mm and smaller than about 4.9 mm, the biasing force of the Belleville spring 40 gradually reduces in an amount corresponding to an increase in the bending amount. Further, when the bending is equal to or larger than about 1.6 mm, the biasing force of the Belleville spring 40 gradually increases in an amount corresponding to an increase in the bending amount.

In one configuration, at the pivot start position of the push lever 51 (i.e., the clutch disengagement operation start position), an interval W1 (refer to FIG. 2) between the support plate 37 and the pressure plate 39 is set such that the biasing force of the Belleville spring 40 is about 1170 N. The corresponding bending amount of the Belleville spring 40 is about 2 mm. Further, at the pivot finish position of the push lever 51 (i.e., the clutch disengagement operation finish position), an interval W2 (refer to FIG. 6) between the support plate 37 and the pressure plate 39 is set such that the biasing force of the Belleville spring 40 is about 490 N. By setting the bending amount of the Belleville spring 40 at the pivot start position (i.e., the clutch disengagement operation start position) and the bending amount of the Belleville spring 40 at the pivot finish position (i.e., the clutch disengagement operation finish position) as described above, the force (i.e., the biasing force of the Belleville spring 40) applied to the push lever 51 from the pivot start position (i.e., the clutch disengagement operation start position) to the pivot finish position (i.e., the clutch disengagement operation finish position) is gradually reduced.

With reference now to FIG. 2, FIG. 5, FIG. 6 and FIG. 8, the clutch disengagement operation will be described. First, the wire 9 connected to the attaching portion 51b of the push lever 51 is pulled by pivoting the clutch lever 7 in the A direction while the clutch is in the engaged state shown in FIG. 2. Thereby, the push lever 51 starts to pivot in the D direction from the clutch engaged state shown in FIG. 5. With reference to FIG. 8, as the push lever 51 starts to pivot, the push rod 41 (i.e., the cam follower 41a) is pressed in the C direction by the push lever 51 (i.e., the cam 51c) and, therefore, the push rod 41 is axially moved in the C direction.

With reference to FIG. 6, when the push rod 41 is moved in the C direction, the pressure plate 39 is pressed in the C direction against the biasing force of the Belleville spring 40 by the push rod 41. Thereby, the movement of the pressure plate 39 releases pressure being applied to the clutch disk 36 in the B direction by the pressing portion 39a of the pressure plate 39. Therefore, the clutch disk 36 and the friction disk 35 can move in the C direction and the friction produced by adjoining clutch and friction disks 36, 35 is reduced or eliminated as they separate from each other. As a result, when the clutch housing 33 rotates, sufficient friction force is not generated between the clutch disk 36 and the friction disk 35 to cause the clutch boss 34 and the clutch housing 33 to be coupled for rotation. In other words, the clutch is disengaged.

In one configuration, the torque generated at the push lever 51 (i.e., the cam 51c) at the pivot start position can be reduced by increasing the lever ratio at the pivot start position of the push lever 51 by forming the cam 51c of the push lever 51 and the cam follower 41a of the push rod 41 such that the lever ratio at the pivot start position of the push lever 51 (i.e., the clutch disengagement operation start position) is larger than the lever ratio at the pivot finish position (i.e., the clutch disengagement operation finish position) of the push lever 51. Thereby, when the friction disk 35 and the clutch disk 36 that adjoin each other are separated as the clutch begins to disengage, the push lever 51 can be pivoted in the A direction from the pivot start position with a relatively small force. By using the Belleville spring 40, the force applied to the push lever 51 (i.e., the cam 51c) at the pivot finish position (i.e., the clutch disengagement operation finish position) is smaller than the force applied to the push lever 51 (i.e., cam 51c) at the pivot start position (i.e., the clutch disengagement operation start position), even when the lever ratio at the pivot finish position of the push lever 51 is smaller at the pivot finish position, the torque generated at the push lever 51 (i.e., the cam 51c) can be restrained from being increased. Thereby, when the clutch is maintained in a disengaged position, the push lever 51 can be maintained at the pivot finish position with a relatively small force. As a result, not only in starting to disengage the clutch but also in maintaining the disengagement of the clutch, the clutch lever 7 connected to the push lever 51 by way of the wire 9 can be operated with a relatively small force and, therefore, the operability of the clutch lever 7 can be improved.

In one configuration, as described above, by increasing the lever ratio at the pivot start position (i.e., the clutch disengagement operation start position) of the push lever 51 and providing the Belleville spring 40 such that the force operated to the push lever 51 is reduced at the pivot finish position of the push lever 51 (i.e., the clutch disengagement operation finish position), loads of operating the push lever 51 (i.e., the clutch lever 7) at both of the pivot start position of the push lever 51 (i.e., the clutch disengagement operation start position) and the pivot finish position of the push lever 51 (i.e., the clutch disengagement operation finish position) can be reduced and, therefore, in comparison with increasing only the lever ratio by the cam, an amount of a change in the loads of operating the push lever 51 (i.e., the clutch lever 7) at the pivot start position of the push lever 51 (i.e., the clutch disengagement operation start position) and the pivot finish position of the push lever 51 (i.e., the clutch disengagement operation finish position) can be reduced. Thus, the clutch lever 7 can be operated smoothly and the operability of the clutch lever 7 can be improved.

In one configuration, as described above, by setting the pivot radius R11 of the cam 51c at the pivot start position to be smaller than the pivot radius R12 of the cam 51c at the pivot finish position, the lever ratio (L1/R11) at the pivot start position of the push lever 51 can be enlarged relative to the lever ratio (L1/R12) at the pivot finish position of the push lever 51.

In some configurations, as described above, the extension EL1 moves from one side of the pivoting axis CA1 of the push lever 51 to the other side of the pivoting axis CA1 as the push lever 51 moves from the pivot start position to the pivot finish position. Thereby, in pressing, a force in the E direction, which is a direction orthogonal to the C direction, can be restrained from being exerted from the cam 51c to the cam follower 41c and, therefore, the force in the E direction can be restrained from being exerted to the push rod 41. As a result, the push rod 41 is less likely to be bent.

In one configuration, as described above, because the force (i.e., the biasing force of the Belleville spring 40) applied to the push lever 51 gradually reduces from the pivot start position (i.e., the clutch disengagement operation start position) to the pivot finish position (i.e., the clutch disengagement operation finish position) of the push lever 51, the lever ratio can be reduced from the pivot start position (i.e., the clutch disengagement operation start position) to the pivot finish position (i.e., the clutch disengagement operation finish position) of the push lever 51 (i.e., the cam 51c). In other words, because the force applied to the push lever 51 (i.e., the cam 51c) is reduced by the Belleville spring 40, the synthesized force of the cam 51c and the Belleville spring 40 allow a change in the force operated to the push lever 51 such that application of force to the push lever 51 can be made smoother and therefore, the clutch lever 7 can be operated more smoothly.

FIG. 10 is a graph showing a relationship between an amount of pivoting of the clutch lever and a reactive force applied to the clutch lever. FIG. 11 is a graph showing a relationship between the amount of pivoting of the clutch lever and the lever ratio of the push lever. FIG. 12 is a graph showing a relationship between the amount of pivoting of the clutch lever and the biasing force of the clutch spring while FIG. 13 is a graph showing a relationship between the amount of pivoting of the clutch lever and a margin of disengaging the clutch. A position of 0 mm of the abscissa (i.e., an amount of pivoting of the clutch lever) in FIG. 10 through FIG. 13 designates the pivot start position of the clutch lever (i.e., the clutch disengagement operation start position) and a position of about 53 mm designates the pivot finish position of the clutch lever (i.e., the clutch disengagement operation finish position) for one particular construction. Further, the margin of disengaging of the clutch of the ordinate of FIG. 13 designates an amount of movement of the pressure plate toward a disengaging position. Next, an explanation will be given of a result of a simulation for confirming an effect with regard to the operability of the clutch system of the construction mentioned above.

First, in the constitution of the first embodiment shown in FIG. 2, there is investigated a relationship among the amount of pivoting the clutch lever 7 in A direction, the reactive force applied to the clutch lever 7, the lever ratio of the push lever 51, the margin of clutch disengagement (i.e., the amount of movement of the pressure plate 39 in the C direction) and the biasing force of the Belleville spring (i.e., the clutch spring) 40. Further, according to the simulation, as a comparative example in correspondence with the background art, the comparative example is formed, not by a comparative example of increasing only the lever ratio with the cam, but by a clutch constituted such that the pressure plate is urged by a compression coil spring (i.e., a clutch spring) and the push rod is moved by a push lever that is not provided with a cam.

As shown by FIG. 10, the reactive force applied to the clutch lever is smaller than that of the comparative example in a range of the amount of pivoting the clutch lever of 0 mm through about 53 mm. Specifically, whereas the reactive force applied to the clutch lever is about 30 N according to the first embodiment at the pivot start position (0 mm), the reactive force is about 40 N in the comparative example. Further, whereas the reactive force applied to the clutch lever is about 22 N according to the first embodiment at the pivot finish position (about 53 mm), the reactive force is about 38 N according to the comparative example. Thus, when constructed in the manner set forth above, the clutch lever 7 can be pivoted in the A direction from the pivot start position by a relatively smaller force and the clutch lever 7 can be maintained in the finish position with a relatively smaller force.

As shown by FIG. 11, whereas the lever ratio of the push lever at the pivot start position (0 mm) is about 9 according to the construction described above, the lever ratio is about 6.8 according to the comparative example. It is conceivable from the result that, at the pivot start position (0 mm), the lever ratio of the push lever 51 is larger than that of the comparative example and therefore, the reactive force operated to the clutch lever 7 is smaller.

As shown by FIG. 12, whereas the biasing force of the clutch spring at the pivot finish position (e.g., about 53 mm) is about 650 N in one configuration, the biasing force is about 1220 N according to the comparative example. It is conceivable from the result that, according one configuration, at the pivot finish position (e.g., about 53 mm), the biasing force of the Belleville spring (i.e., the clutch spring) 40 is smaller than that of the comparative example and, therefore, the reactive force applied to the clutch lever 7 is reduced.

With reference to FIG. 13, approximately the same margin (i.e., about 1.7 mm) of disengagement of the clutch at the pivot finish position (e.g., about 53 mm) can be achieved with the configuration described above and with the comparative example. Thus, the clutch construction described above enables the clutch to be firmly brought into the disengaged state through the improved operability of the clutch lever 7.

With reference now to FIG. 14, a sectional view is provided that shows a state of clutch engagement for another clutch system that is arranged and configured in accordance with certain features, aspects and advantages of the present invention. FIG. 15 and FIG. 16 are detailed views of a state of engagement of this clutch system. FIG. 17 is a sectioned view showing the clutch system of FIG. 14 being disengaged. FIG. 18 is a detailed view of disengagement of the clutch system of FIG. 14. In the configuration of FIG. 14, clutching pressure is released by pulling the pressure plate, as best shown by comparing FIG. 14 and FIG. 17. For convenience, like numerals will be used to refer to the same components that were described with respect to the first embodiment described above.

With reference initially to FIG. 14, a clutch mechanism portion 60 of illustrated configuration in FIG. 14 comprises a main shaft 61. The main shaft 61 in the illustrated configuration comprises a generally circular column. The main shaft can be powered by an engine (not illustrated). One end of the clutch boss 34 in the B direction (and in the C direction) is attached, such as with the bolt 38, to a support plate 62 having a hole portion 62a. A pressure plate 63 can be arranged between the clutch boss 34 and the support plate 62. The pressure plate 63 preferably comprises a pressing portion 63a that presses the clutch disk 36 in the B direction. The Belleville spring (i.e., the clutch spring) 40, similar to that of the embodiment described above, is arranged between the support plate 62 and the pressure plate 63. The pressure plate 63 is an example of a pressing member. As mentioned above, components from the first configuration described above (e.g., parts 32 through 36) can be provided in the current configuration (i.e., the current configuration uses similar structures relative to those of the parts).

To engage the clutch, the pressure plate 63 is biased in the B direction by the Belleville spring 40. The pressure plate 63 presses the clutch disk 36 in the B direction due to contact with, or forces transferred from, the pressing portion 63a of the pressure plate 63. Thus, similar to the configuration described above, when the clutch is engaged, the clutch boss 34 rotates along with the housing 33 and, therefore, the main shaft 61 rotates due to its connection with the clutch boss 34.

A bearing 64 can rotatably connect a pulling member 65 to the pressure plate 63. The pulling member 65 enables the pressure plate 63 to be pulled in the C direction. In the illustrated configuration, the pulling member 65 can define an example of a relay member.

When the pressure plate 63 is pulled in the C direction by the pulling member 65, the clutch is disengaged. Specifically, as shown by FIG. 17, when the clutch is being disengaged, the pulling member 65 pulls the pressure plate 63 in the C direction against the biasing force of the Belleville spring 40. Because the pressure plate 63 is pulled in the C direction, the pressing forces of the pressing portion 63a of the pressure plate onto the clutch disk 36 in the B direction are reduced, and preferably substantially removed. Thus, the pressing portion 63a is unloaded from the clutch disks. Thereby, similar to the configuration described above, when the clutch is disengaged, the main shaft 61 and the clutch boss 34 do not rotate even if the clutch housing 33 is rotated.

As shown by FIG. 14, an end portion of the pulling member 65 projects in the C direction from the hole portion 62a of the support plate 62 and an opening 65a is defined in this end portion of the pulling member 65. A cam follower 65b can be defined in an inner side face of the hole portion 65a of the pulling member 65. The cam follower 65b defines another example of a second contact portion.

With reference to FIG. 14 and FIG. 15, the push lever 51 is inserted into the opening 65a of the pulling member 65. The push lever 51 presses the pulling member 65 to move the pulling member 65 in the C direction. The push lever 51 preferably comprises a structure similar to that of the push lever 51 described above. As shown by FIG. 16, by inserting the push lever 51 into the opening 65a of the pulling member 65, a cam 51c of the push lever 51 and the cam follower 65b of the pulling member 65 can be brought into contact with each other. By pivoting the push lever 51 (i.e., the cam 51c) in the H direction from a pivot start position (see FIG. 16), the pulling member 65 (i.e., the cam follower 65b) moves in the C direction. By moving to the disengagement finish position (see FIG. 18) by pivoting the push lever 51 (i.e., the cam 51c) in the H direction from the pivot start position of FIG. 16, the clutch is moved to disengagement (see FIG. 17) from engagement (see FIG. 14). As shown by FIG. 15, the push lever 51 (i.e., the cam 51c) can be pivoted in the H direction (see FIG. 16) about the pivoting axis CA1, which defines the fulcrum, by pulling the wire 9 with movement of the clutch lever (not illustrated) in a manner similar to that described above.

The cam 51c of the push lever 51 and the cam follower 65b of the pulling member 65 can be configured such that the lever ratio at the pivot start position of the push lever 51 (i.e., the clutch disengagement operation start position) is larger than the lever ratio at the pivot finish position of the push lever 51 (i.e., the clutch disengagement operation finish position). Specifically, the distance R21 in the E direction (i.e., the direction orthogonal to the axial direction (C direction) of the pulling member 65) defined from the pivoting axis CA1 of the pivot start position (see FIG. 16) to the contact position P2 is smaller than the distance R22 defined from the pivoting axis CA1 at the pivot finish position (see FIG. 18) to the contact position P2. Therefore, the lever ratio (L1/R21) of the push lever 51 at the pivot start position (i.e., the clutch disengagement operation start position) is larger than the lever ratio (L1/R22) of the push lever 51 at the pivot finish position (i.e., the clutch disengagement operation finish position).

With reference to FIG. 16, the opening 65a of the pulling member 65 comprises the cam follower 65b. As shown, at the pivot start position of the push lever 51 (see FIG. 16), the cam 5ac and the cam follower 65b make contact at the position P2 and the extension EL2 extends generally in the E direction, which is a direction that is generally orthogonal to the C direction, which in turn defines a generally axial direction of the pulling member 65. The extension EL2 preferably is disposed on a first side of the pivoting axis CA1 of the push lever 51. As shown in FIG. 18, when the push lever 51 reaches the pivot finish position by being pivoted in the H direction, the extension EL2 moves to the second side of the pivoting axis CA1 of the push lever 51.

The Belleville spring 40, similar to that of the configuration described above, is used as the clutch spring. Thus, the force applied to the push lever 51 (i.e., the cam 51c) at the pivot finish position of the push lever 51 (i.e., the clutch disengagement operation finish position) is smaller than the force applied to the push lever 51 (i.e., the cam 51c) at the pivot start position of the push lever 51 (i.e., the clutch disengagement operation start position).

Next, an explanation will be given of operation when the clutch according to the configuration shown in FIG. 14 through FIG. 18 is disengaged after having been engaged.

First, by operating the clutch lever (not illustrated) from the state shown in FIG. 14, the wire 9 (see FIG. 15) connected to the attaching portion 51b of the push lever 51 is pulled. Thus, the push lever 51 starts to pivot in the H direction while the clutch is in the engaged position, as shown in FIG. 16. As shown by FIG. 18, as the lever 51 turns, the pulling member 65 (i.e., the cam follower 65b) is pressed in the C direction by the push lever 51 (i.e., the cam 51c) and therefore, the pulling member 65 is moved in the C direction.

When the pulling member 65 is moved in the C direction, as shown by FIG. 17, the pressure plate 63 is pulled by the pulling member 65 in the C direction against the biasing force of the Belleville spring 40. Thus, the clutch disk 36 is no longer forced in the B direction by the pressing portion 63a of the pressure plate 63 and the force on the clutch disk 36 is released. Therefore, the clutch disk 36 and the friction disk 35 can move in the C direction and the adjoining clutch disks 36 and friction disks 35 can separate from each other. As a result, if the clutch housing 33 is rotated, sufficient friction is not generated between the clutch disk 36 and the friction disk 35 to lock the clutch boss 34 to the housing 33. Thus, the clutch boss 34 and the main shaft 61 likely will not rotate along with the housing 33. In other words, the clutch has been disengaged.

By structuring the cam 51c of the push lever 51 and the cam follower 65b of the pulling member 65 such that the lever ratio at the pivot start position of the push lever 51 (i.e., the clutch disengagement operation start position) is larger than the lever ratio of the pivot finish position of the push lever 51 (i.e., the clutch disengagement operation finish position), the torque generated by the push lever 51 (i.e., the cam 51c) at the pivot start position can be reduced by making the lever ratio at the pivot start position of the push lever 51 larger. By using the Belleville spring 40 as the clutch spring, the force applied to the push lever 51 (i.e., the cam 51c) at the pivot finish position (i.e., the clutch disengagement operation finish position) is smaller than the force applied to the push lever 51c (i.e., the cam 51c) at the pivot start position (i.e., the clutch disengagement operation start position), even when the lever ratio at the pivot finish position of the push lever 51 is small, at the pivot finish position, the torque generated by the push lever 51 (cam 51c) can be maintained small. As a result, similar to the configuration mentioned above, not only in starting to disengage the clutch but also in maintaining disengagement of the clutch, the clutch lever (not illustrated) connected to the push lever 51 by way of the wire 9 can be operated by small forces and, therefore, the operability of the clutch lever can be improved.

As described above, when the cam follower 65b is pressed by the cam 51c of the push rod 51, movement of the cam follower 65b is transferred to the pulling member 65, which is connected to the pressure plate 63 and the pulling member 65 such that the pulling member can be moved against the biasing force of the Belleville spring 40.

Further, other effects of the configuration of FIGS. 14-18 are similar to those of the first configuration described above.

With reference to FIG. 19-24, another clutch system that is arranged and configured in accordance with an embodiment having certain features, aspects and advantages of the present invention is shown. FIGS. 19-21 show the clutch system engaged or engaging while FIGS. 23-24 show the clutch system disengaged or disengaging. This clutch system is different for the first two illustrated configurations in that the clutch system comprises a hydraulic mechanism portion. As with the configuration just described, further description of like components (e.g., parts 31-40) that comprise a clutch mechanism portion 70 will not be further described but will maintain the same reference numerals.

The illustrated clutch mechanism portion 70, as shown by FIG. 21, comprises a clutch release piston 81 that is attached to an end portion of a push rod 71. The piston 81 is attached to an opposite end of the push rod 71 relative to the pressure plate 39. The clutch release piston 81 preferably is positioned inside of a clutch release cylinder 82. Further, a clutch release spring 83 is positioned inside of the clutch release cylinder 82. The clutch release spring 83 biases the clutch release piston 81 in the C direction. An oil hose 84 hydraulically couples the clutch release cylinder 82 with a hydraulic master cylinder 85.

The hydraulic master cylinder 85 includes a master cylinder 86, a piston 87, and a compression spring 88. The master cylinder 86 is an example of a cylinder. The piston 87 is received inside of the master cylinder 86 and is axially moveable in the I and J directions. Preferably, the piston 87 is axially moveable along a center axis of the master cylinder 86. The piston 87 can be moved in I direction by movement of a relay piston 94. As illustrated, the compression spring 88 can be a coil spring and can be positioned inside of the master cylinder 86. Other types of biasing members can be used and the biasing member can be located in other positions. The compression spring 88 biases the piston 87 in the J direction.

The master cylinder 86 can be formed with two oil path ports 86a, 86b. The oil path port 86a can be fitted with a connector 89, and the connecter 89 can be attached with the oil hose 84 that connects to the clutch release cylinder 82. Similarly, the oil path port 86b can be fitted with a connector 90 that connects with a reservoir tank 92 by way of an oil hose 91. The reservoir tank 92 can be used to adjusting a hydraulic pressure inside of the master cylinder 86. Specifically, when the hydraulic pressure inside of the master cylinder 86 becomes excessively high, oil inside of the master cylinder 86 is delivered to the reservoir tank 92. On the other hand, when the hydraulic pressure inside of the master cylinder 86 becomes excessively low, the oil is replenished to the inside of the master cylinder 86 from the reservoir tank 92. The reservoir tank 92 is an example of an oil amount adjusting portion or subsystem. As used herein, oil can include hydraulic fluid and the like.

In the illustrated configuration, a portion of the piston 87 comprises a spring holding portion 87a that holds or supports the spring 88. Another portion of the illustrated piston 87 comprises a receiving portion 87b. The receiving portion 87b is fitted with a pressing portion 94a of the relay piston 94. A primary seal 93a is disposed proximate the spring holding portion 87a while a secondary seal 93b is disposed proximate the receiving portion 87b. As thus described, a hydraulic mechanism portion 80 comprises the clutch release piston 81, the clutch release cylinder 82, the clutch release spring 83 and the hydraulic master cylinder 85. As shown by FIG. 19, the hydraulic master cylinder 85 can be attached to the handle 5. In the illustrated configuration, the hydraulic master cylinder 85 is attached to the handle 5 by way of the holder 6a.

As shown by FIG. 21, the relay piston 94 is positioned inside of the master cylinder 86. The relay piston 94 is movable in the I and J direction. Preferably, the relay piston is axially movable along the center axis of the master cylinder 86. One end portion of the relay piston 94 can be provided with a pressing portion 94b that is coupled to, or in contact with, the receiving portion 87b of the piston 87. Preferably, the relay piston 94 presses the piston 87 in I direction. The relay piston 94 is an example of a relay member.

When the piston 87 is pressed in the I direction by the relay piston 94, the clutch is disengaged. Specifically, as shown by FIG. 24, when the clutch is being disengaged, the piston 87 is pressed in the I direction by the relay piston 94. The movement of the piston 87 causes a change in the hydraulic pressure inside of the master cylinder 86. The change in hydraulic pressure displaces some of the oil inside of the master cylinder 86 to flow to the clutch release cylinder 82. The flow into the clutch release cylinder 82 causes a change in the hydraulic pressure inside of the clutch release cylinder 82. The change in hydraulic pressure inside of the clutch release cylinder moves the clutch release piston 81 and the push rod 71 in the C direction and the pressure plate 39 is pressed in the C direction by the push rod 71. Thus, similar to the first configuration described above, when the clutch is being disengaged, the main shaft 31 and the clutch boss 34 are not sufficiently coupled to the clutch housing 33 and only the clutch housing 33 continues to rotate with the engine.

As shown by FIG. 21, an end portion of the relay piston 94 projects in the J direction from inside of the master cylinder 86. The end portion comprises an end face of the relay piston 94. The end face can define the cam follower 94b. The cam follower 94b contacts a cam 101a of a clutch lever 101. Preferably, the end portion of the relay piston comprising the cam follower 94b has a larger diameter relative to the other end of the relay piston 94. The cam follower 94b is an example of the second contact portion.

With reference again to FIG. 19, the holder 6a can comprise the clutch lever 101. The clutch lever 101 can press the relay piston 94 in the I direction. The clutch lever 101 preferably is pivotable. In one configuration, a shaft 102 defines a fulcrum with a pivoting axis CA2 extending therethrough. The clutch lever 101 defines an example of the lever mechanism portion and the lever. The clutch lever 101 comprises the cam 101a, which is sized and configured to contact the cam follower 94b. The cam 101a defines an example of the first contact portion. By pivoting the clutch lever 101 (i.e., the cam 101a) in the K direction from the pivot start position (see FIG. 19 and FIG. 20), the relay piston 94 (i.e., the cam follower 94b) is moved in the I direction. By moving to the pivot finish position (see FIG. 22 and FIG. 23) though pivoting of the clutch lever 101 (i.e., the cam 101a) in the K direction from the pivot start position, the clutch is moved from the engaged state (see FIG. 21) to the disengaged state (see FIG. 24). Further, in pivoting the clutch lever 101, a force is exerted to a region 400 surrounded by broken lines of FIG. 19 and FIG. 22. The region 400 exerted with the force preferably is a region that is remote from the pivoting axis CA2 of the clutch lever 101 by a distance L2.

The cam 101a of the clutch lever 101 and the cam follower 94b of the relay piston 94 can be formed such that a lever ratio at the pivot start position of the clutch lever 101 (i.e., the clutch disengagement operation start position) is larger than a lever ratio at the pivot finish position of the clutch lever 101 (i.e., the clutch disengagement operation finish position). Specifically, a distance R31 in the G direction (i.e., a direction orthogonal to the I direction) from the pivoting axis CA2 to a contact position P3 at the pivot start position (see FIG. 20) is smaller than a distance R32 in G direction from the pivoting axis CA2 to the contact position P3 at the pivot finish position (see FIG. 23). Thus, the lever ratio (L2/R31) of the clutch lever 101 at the pivot start position (i.e., the clutch disengagement operation start position) can be larger than the lever ratio (L2/R32) of the clutch lever 101 at the pivot finish position (i.e., the clutch disengagement operation finish position).

As shown by FIG. 20, at the pivot start position of the clutch lever 101, an extension EL3, which extends in the G direction (i.e., a direction orthogonal to the I direction or axial direction of the relay piston 94), is disposed on a side in the J direction relative to the pivoting axis CA2 of the clutch lever 101. As shown by FIG. 23, when the clutch lever 101 reaches the pivot finish position by being pivoted in the K direction, the extension EL3 is moved to a side in the I direction (i.e., the opposite side) of the pivoting axis CA2 of the clutch lever 101.

As shown by FIG. 21 and FIG. 24, the Belleville spring 40, similar to that of the first configuration described above, is used as the clutch spring and, therefore, a force exerted on the clutch lever 101 (i.e., the cam 101a) at the pivot finish position of the clutch lever 101 (i.e., the clutch disengagement operation finish position) is smaller than a force applied to the clutch lever 101 (i.e., the cam 101a) at the pivot start position of the clutch lever 101 (i.e., the clutch disengagement operation start position).

Next, with reference to FIG. 21, FIG. 22 and FIG. 24, an explanation will be given of how the clutch is disengaged from an engaged state.

First, the clutch lever 101 is pivoted in the K direction from the state shown in FIG. 19 and FIG. 21. As this is done, as shown by FIG. 22, the relay piston 94 (i.e., the cam follower 94b) is pressed in the I direction by the clutch lever 101 (i.e., the cam 101a) and, therefore, the relay piston 94 is moved in the I direction.

Movement of the relay piston 94 in the I direction, as shown by FIG. 24, moves the piston 87 of the hydraulic master cylinder 85 in the I direction. By moving the piston 87 in the I direction, the hydraulic pressure inside of the master cylinder 86 is increased. The oil inside of the master cylinder 86 flows to the inside of the clutch release cylinder 82 by way of the oil hose 84, which is connected to the oil path port 86a.

When the oil flows to the inside of the clutch release cylinder 82, the hydraulic pressure inside of the clutch release cylinder 82 increases and, therefore, the clutch release piston 81 moves in the C direction. The push rod 71, which is in contact with the clutch release piston 81, moves in the C direction and, therefore, the pressure plate 39 moves in the C direction against the biasing force of the Belleville spring 40. Thus, the pressing portion 39a of the pressure plate 39 releases the pressure applied to the clutch disk 36 in the B direction. Without the application of the pressure from the pressure plate 39, the clutch disk 36 and the friction disk 35 can move apart in the C direction and insufficient friction will exist between adjoining disks 36, 35 to cause the disks to lockup together for rotation. As a result, when the clutch housing 33 is rotated, insufficient friction force is generated between the clutch disk 36 and the friction disk 35 to cause the clutch boss 34 and the main shaft 31 to rotate with the clutch housing 33. That is, the clutch is disengaged.

As described above, by forming the cam 101a of the clutch lever 101 and the cam follower 94b of the relay piston 94 such that the lever ratio at the pivot start position of the clutch lever 101 (i.e., the clutch disengagement operation start position) is larger than the lever ratio at the pivot finish position of the clutch lever 101 (i.e., the clutch disengagement operation finish position), the torque generated by the clutch lever 101 at the pivot start position can be reduced by making the lever ratio at the pivot start position of the clutch lever 101 larger. Thereby, in starting to disengage the clutch, when the friction disk 35 and the adjoining clutch disks 36 are separated from each other, the clutch lever 101 can be pivoted in the K direction from the pivot start position by a relatively small force. Further, by using the Belleville spring 40 as the clutch spring such that the force applied to the clutch lever 101 (i.e., the cam 101a) at the pivot finish position (i.e., the clutch disengagement operation finish position) is smaller than the force operated to the clutch lever 101 (i.e., the cam 101a) at the pivot start position (i.e., the clutch disengagement operation start position), even when the lever ratio at the pivot finish position of the clutch lever 101 is small, the torque generated by the clutch lever 101 at the pivot finish position can be kept lower. Thus, when the clutch is maintained in a disengaged state, the clutch lever 101 can be maintained at the pivot finish position with a relatively small force. As a result, not only in starting to disengage the clutch but also in maintaining disengagement of the clutch, the clutch lever 101 can be operated by a relatively small force and, therefore, the operability of the clutch lever 101 can be improved.

As described above, by having the pressure plate 39 move against the biasing force of the Belleville spring 40 under the influence of the hydraulic pressure generated inside of the master cylinder 86, by configuring the piston 87 to be pressed by the relay piston 94, even when the friction disk 35 and the clutch disk 36 are expanded by heat, and by adjusting an oil amount inside of the master cylinder 86 by providing the reservoir tank 92, the hydraulic pressure inside of the master cylinder 86 at the pivot start position of the clutch lever 101 (i.e., the clutch disengagement operation start position) can be restrained from being changed in significant amounts. Thus, an amount of pivoting the clutch lever 101 capable of disengaging the clutch is less likely to significantly change.

As described above, by fitting the relay piston 94 inside of the master cylinder 86, the piston 87 can be easily pressed by the relay piston 94 in the direction along the center axis of the master cylinder 86.

Further, this embodiment also achieves other effects that are similar to that of the first configuration described above.

With reference now to FIG. 25 and FIG. 26, a modified version of the embodiment of FIGS. 19-24 is shown. In reference to FIG. 25 and FIG. 26, according to the modified version, a piston 111 is extends into the master cylinder 86 such that an end portion 111a thereof extends outward of the master cylinder 86 in the J direction. The end portion 111a of the piston 111 preferably comprises an enlarged diameter that is larger than that of at least another portion of the piston 111.

A pivoting member 112 is attached to the holder 6b. The holder 6b, as mentioned above, is attached to the handle. A shaft 113 defines a pivoting axis CA4 and a fulcrum for the pivoting member 112. A side face of the pivoting member 112 comprises a projected portion 112a that is arranged to come into contact with the end portion 111a of the piston 111. The pivoting member 112 can move the piston 111 in the I direction. The pivoting member 112 also is an example of the relay member.

As shown by FIG. 26, when the pivoting member 112 pivots about the shaft 113 and the piston 111 is moved in the I direction by the projected portion 112a of the pivoting member 112, the clutch is disengaged.

As shown by FIG. 25, a cam follower 112b is defined by a side face of the pivoting member 112. More specifically, the cam follower 112b is positioned on an opposite side of the pivoting member 112 relative to the projected portion 112a. The cam follower 112b provides another example of the second contact portion.

The clutch lever 114 is connected to the holder 6b, which is fixed to the handle 5 in the illustrated configuration. The clutch lever 114 moves the pivoting member 112 in the I direction. The clutch lever 114 is pivotably mounted with a shaft 115, which defines a pivoting axis CA3 and which functions as a fulcrum. The clutch lever 114 is an example of the lever mechanism portion and the lever. The clutch lever 114 can be formed with the cam 114a that contacts the cam follower 112b. The cam 114a is an example of the first contact portion. By pivoting the clutch lever 114 (i.e., the cam 114a) in the K direction from a pivot start position (see FIG. 25), the pivoting member 112 (i.e., the cam follower 112b) is pivoted by movement in the Q direction. By moving to the pivot finish position (see FIG. 26) through pivoting the clutch lever 114 (i.e., the cam 114a) in the K direction from the pivot start position (see FIG. 25), the clutch is brought into a disengaged state (see FIG. 26) from an engaged state (see FIG. 25). Further, by pivoting the clutch lever 114, a force is exerted to a region 500 surrounded by broken lines in FIG. 25 and FIG. 26. The region 500 that receives the force is a region remote from the pivoting axis CA3 of the clutch lever 114 by a distance L3.

As illustrated, the cam 114a of the clutch lever 114 and the cam follower 112b of the pivoting member 112 are configured to provide a lever ratio of the clutch lever 114 at the pivot start position (i.e., the clutch disengagement operation start position) that is larger than a lever ratio of the clutch lever 114 at the pivot finish position (i.e., the clutch disengagement operation finish position). Specifically, at the pivot start position (see FIG. 25), a distance R411 is defined between a line normal to the point of contact P4 and a parallel line extending through the axis CA3. At the same time, a distance R412 is defined between the same line normal to the point of contact P4 and another parallel line extending through the axis CA4. The distance R411 is smaller than the distance R412. On the other hand, at the pivot finish position (see FIG. 26), a distance R421 corresponds to the distance R411 and a distance R422 corresponds to the distance R412. At the pivot finish position, the distance R421 is larger than the distance R422. Therefore, in the arrangement shown in FIG. 25 and FIG. 26, the lever ratio (R412/R411) of the clutch lever 114 at the pivot start position (i.e., the clutch disengagement operation start position) is larger than the lever ratio (R422/R421) of the clutch lever 114 at the pivot finish position (i.e., the clutch disengagement operation finish position).

As with the configurations above, the embodiment of FIG. 25 and FIG. 26 also features many of the aspects and advances of the embodiment described with reference to FIG. 19-FIG. 24.

With the embodiment of FIG. 25 and FIG. 26, when the pivoting member 112 is pivoted by the clutch lever 114, the piston 111 can be efficiently moved by the pivoting member 112 in a direction along the center axis of the master cylinder 86.

The embodiment of FIG. 25 and FIG. 26 also have similar advantages to those described in the embodiments described above.

The embodiments disclosed herein should be regarded as examples that are arranged and configured in accordance with certain features, aspects and advantages of the present invention. The range of the invention is shown not by the above-described explanation of the embodiments but by the scope of claims and includes all of changes within the significance and the range equivalent to the scope of claims.

For example, although each of the embodiments described above is shown in the context of a motorcycle, other vehicles may also benefit from certain features, aspects and advantages of the present invention.

In addition, although the clutch has been constructed so that it is disengaged by pressing the pressure plate outward (e.g., in the C direction), other configurations also can be used. In other words, the pressure plate can be moved inward rather than outward.

Moreover, while each of the illustrated embodiments features the Belleville spring having the spring characteristic shown in FIG. 9, other biasing members also may be used keeping in mind the desire for spring characteristic similar to the spring characteristic shown in FIG. 9. For example, as shown in FIG. 27, a torsion coil spring 121 may be used in place of the Belleville spring. Thus, the torsion coil spring 121 provides another example of an urging or biasing member.

As illustrated in FIG. 27, spring holding portions 122a, 123a can be provided to hold the torsion coil spring 121. The spring holding portions 122a, 123a can be provided in clutch boss 122 and the pressure plate 123 respectively. The spring holding portion 112a of the clutch boss 122 can be arranged the pressure plate 123 side of the clutch boss 122, and the spring holding portion 123a of the pressure plate 123 can be arranged on the clutch boss 122 side of the pressure plate 123. The torsion coil spring 121 can be held in a contracted state by the spring holding portions 122a and 123a. Thus, the pressure plate 123 is urged in B direction by the torsion coil spring 121. The pressure plate 123 is another example of the pressing member.

With reference to FIG. 28, when the pressure plate 123 is moved in the C direction, the torsion coil spring 121 is bent such that both end portions of the torsion coil spring 121 are moved toward each other. Thus, a biasing force exerted to the pressure plate 123 is reduced. Therefore, similar to the embodiments discussed above using the Belleville spring as the clutch spring, a force applied to the clutch lever at the pivot finish position (i.e., the clutch disengagement operation finish position) of the clutch lever (not illustrated) is smaller than a force applied to the clutch lever at the pivot start position (i.e., the clutch disengagement operation start position) of the clutch lever.

The clutch boss 122 can be formed with a spline portion 122b and the gear portion 36a of the clutch disk 36 can mesh with the spline portion 122b. Further, the pressure plate 123 can be formed with a pressing portion 123b, and the clutch disk 36 can be moved in the B direction by the pressing portion 123b.

A biasing member 130 such as that shown in FIG. 29 also may be used. As shown by FIG. 29, the biasing member 130 comprises a pair of sliding members 131a and 131b, a compression coil spring 132, and a pair of rollers 133a and 133b. The sliding member 131a on one side is fitted to the sliding member 131b on other side. The pair of sliding members 131a, 131b can be fit together in a telescoping manner. The compression coil spring 132 is interposed between the pair of sliding members 131a, 131b. The sliding members 131a, 131b are biased apart by the compression coil spring 132. Further, the rollers 133a, 133b are respectively attached rotatably to end portions of the sliding members 131a, 131b.

In the illustrated configuration, a clutch boss 141 is provided with a holding portion 141a for holding the sliding members 131a, 131b, and the sliding members 131a, 131b are axially moveable in the M direction relative to the holding portion 141a. A pressure plate 142 is provided with a contact face 142a with which the rollers 133a, 133b contact. The pressure plate 142 is another example of the pressing member. When the pressure plate 142 is moved in the C direction as shown by FIG. 30, the rollers 133a, 133b are pressed in opposite directions (i.e., both in the M direction) by the contact face 142a of the pressure plate 142. Thus, the sliding members, 131a, 131b are slid toward each other against a biasing force of the compression coil spring 132.

The contact face 142a of the pressure plate 142 can be formed such that an angle between the contact face 142a and the rollers 133a, 133b changes between the clutch engagement state (see FIG. 29) and the clutch disengagement state (see FIG. 30). Specifically, in the clutch engaged state (see FIG. 29), as shown by FIG. 31, an angle of inclination of the contact face 142a of the pressure plate 142 is such that the biasing force of the biasing member 130 produced in the B direction becomes F1. On the other hand, in the clutch disengagement state (state of FIG. 30), as shown by FIG. 32, the angle of inclination of the contact face 142a of the pressure plate 142 is such that the biasing force of the biasing member 130 produced in the B direction becomes F2, which is smaller than F1. Therefore, similar to the Belleville spring configurations, a force applied to the clutch lever at the pivot finish position (i.e., the clutch disengagement operation finish position) of the clutch lever (not illustrated) is smaller than a force applied to the clutch lever at the pivot start position (i.e., the clutch disengagement operation start position) of the clutch lever.

As shown by FIG. 29, the clutch boss 141 can be formed with a spline portion 141b, and the gear portion 36a of the clutch disk 36 can mesh with the spline portion 141b. The pressure plate 142 can be formed with a pressing portion 142b. The clutch disk 36 can be moved in the B direction by the pressing portion 142b.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Furthermore, certain components, features and aspects can be combined with other components, features and aspect from the various embodiments to define additional modes. Accordingly, the scope of the present invention is intended to be defined only by the claims that follow.

What is claimed is:

1. A clutch comprising:
a lever mechanism portion and a clutch mechanism portion operatively connected to each other; wherein
the lever mechanism portion includes a lever including a first contact portion; and
the clutch mechanism portion includes a pressing member, the clutch mechanism portion further including a first plate and a second plate positioned adjacent to the first plate, the pressing member being arranged to move in a first direction toward the first plate such that the first and second plates are brought into contact with each other and in a second direction away from the first plate such that the first and second plates separate from each other;
the clutch mechanism portion includes a biasing member arranged to bias the pressing member in the first direction;
the clutch mechanism portion includes a relay member, the relay member including a second contact portion, the second contact portion of the relay member being arranged to contact with the first contact portion of the lever at a contact location that varies relative to a pivot axis when the lever is pivoted, the relay member being arranged to transmit movement of the lever of the lever mechanism portion to the pressing member of the clutch mechanism portion;
the lever of the lever mechanism portion is arranged to move between a pivot start position and a pivot finish position such that, when the lever is moved from the pivot start position, the second contact portion of the relay member is in contact with the first contact portion of the lever and the relay member translates the movement of the lever to the pressing member and the pressing member moves in the second direction;
as the contact location varies between the first contact portion of the lever and the second contact portion of the relay member, a lever ratio of the lever changes from a larger lever ratio at the pivot start position to a smaller lever ratio at the pivot finish position;

the biasing member is arranged to apply a decreasing force from the pivot start position to the pivot finish position of the lever; and the contact location at the pivot start position of the lever is on one side of a plane that extends through the pivot axis and that is perpendicular to an axis of the relay member along which the relay member transmits movement of the lever, and the contact location at the pivot finish position of the lever is on an opposite side of the plane that extends through the pivot axis and that is perpendicular to the axis of the relay member.

2. The clutch according to claim 1, wherein the first contact portion of the lever and the second contact portion of the relay member together include a cam and a cam follower that is arranged to be brought into contact with the cam.

3. The clutch according to claim 2, wherein the first contact portion of the lever includes the cam, and the second contact portion of the relay member includes the cam follower.

4. The clutch according to claim 3, wherein the lever of the lever mechanism portion includes a pivoting lever connected to a clutch lever by a wire, and the relay member of the clutch mechanism portion includes a generally rod-shaped configuration including a first end including the cam follower, and a second end being connected to the pressing member.

5. The clutch according to claim 3, wherein the lever of the lever mechanism portion includes a pivoting lever connected to a clutch lever by a wire, and the relay member of the clutch mechanism portion includes a member with a hole, the member being connected to the pressing member and the cam being positioned within the hole and the cam follower being defined by an inner face of the hole.

6. The clutch according to claim 3, wherein the clutch mechanism portion includes a hydraulic mechanism portion, the hydraulic mechanism portion including a cylinder, a piston disposed inside of the cylinder and arranged to move along a center axis of the cylinder under the influence of the relay member, the piston being arranged to generate a hydraulic pressure inside of the cylinder, an oil amount adjusting portion in fluid communication with the cylinder, the oil amount adjusting portion arranged to transfer hydraulic fluid to and from the cylinder, the pressing member being arranged to move against the biasing force of the biasing member by hydraulic pressure generated inside of the cylinder.

7. The clutch according to claim 6, wherein the lever of the lever mechanism portion includes a clutch lever, the clutch lever including the first contact portion, and the relay member of the clutch mechanism portion including the second contact portion and being positioned inside of the cylinder such that the relay member can move in an axial direction within the cylinder.

8. The clutch according to claim 6, wherein the lever of the lever mechanism portion includes a clutch lever, the clutch lever including the first contact portion, and the relay member of the clutch mechanism portion including the second contact portion, the relay member including a pivoting lever, the pivoting lever being operatively connected to the piston and being positioned outside of the cylinder.

9. The clutch according to claim 1, wherein the biasing member includes a Belleville spring.

10. A vehicle comprising the clutch of claim 1.

* * * * *